United States Patent
Fujita et al.

(10) Patent No.: US 7,594,029 B2
(45) Date of Patent: Sep. 22, 2009

(54) SYSTEM AND METHOD FOR EXTERNAL RESOLUTION OF PACKET TRANSFER INFORMATION

(75) Inventors: Norihito Fujita, Tokyo (JP); Atsushi Iwata, Tokyo (JP); Akira Arutaki, Tokyo (JP); Yuichi Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 789 days.

(21) Appl. No.: 10/642,750

(22) Filed: Aug. 19, 2003

(65) Prior Publication Data

US 2004/0047349 A1 Mar. 11, 2004

(30) Foreign Application Priority Data

Aug. 20, 2002 (JP) .............................. 2002-239188

(51) Int. Cl.
*G06F 15/173* (2006.01)
(52) U.S. Cl. ...................................... 709/244
(58) Field of Classification Search .................. 709/244
See application file for complete search history.

(56) References Cited

U.S. PATENT DOCUMENTS

| | | | | |
|---|---|---|---|---|
| 5,434,974 | A * | 7/1995 | Loucks et al. ............... | 709/245 |
| 5,870,550 | A * | 2/1999 | Wesinger et al. ............ | 709/218 |
| 6,016,512 | A * | 1/2000 | Huitema ..................... | 709/245 |
| 6,154,777 | A * | 11/2000 | Ebrahim ..................... | 709/227 |
| 6,434,153 | B1 | 8/2002 | Yazaki et al. | |
| 6,985,964 | B1 * | 1/2006 | Petersen et al. ............. | 709/244 |
| 7,139,838 | B1 * | 11/2006 | Squire et al. ................ | 709/242 |
| 2002/0031142 | A1 * | 3/2002 | Metin et al. ................. | 370/463 |
| 2002/0038339 | A1 * | 3/2002 | Xu ............................. | 709/203 |
| 2002/0124060 | A1 | 9/2002 | Jinzaki | |
| 2003/0208617 | A1 | 11/2003 | Yanagisawa et al. | |

FOREIGN PATENT DOCUMENTS

| | | |
|---|---|---|
| JP | 2-185134 | 7/1990 |
| JP | 8-044638 | 2/1996 |
| JP | 2000-253047 | 9/2000 |
| JP | 2001-339430 | 12/2001 |
| WO | WO 01/33364 | 5/2001 |

* cited by examiner

*Primary Examiner*—Dustin Nguyen
*Assistant Examiner*—Michael E Keefer
(74) *Attorney, Agent, or Firm*—Foley & Lardner LLP

(57) ABSTRACT

When a packet transfer equipment receives a packet, it extracts several types of information contained in the received packet such as the destination IP address and the destination port number and, using the extracted information as the key, inquires of a packet transfer method resolution server about the information related to the packet transfer method. The server keeps the correspondences between several types of information contained in the packet and one or more type of information related to the packet transfer method in the database and, in response to the inquiry from the packet transfer equipment, replies one or more type of information related to the packet transfer method. The packet transfer equipment rewrites several types of information such as the destination IP address and the destination port number according to one or more type of information obtained and transfers the received packet.

8 Claims, 23 Drawing Sheets

110

| INPUT PACKET INFORMATION | | | TRANSFER METHOD | | |
|---|---|---|---|---|---|
| URL | DESTINATION IP ADDRESS | VLAN-ID | SOURCE IP ADDRESS | DESTINATION MAC ADDRESS | VLAN-ID |
| www.aaa.com/* | — | — | 50.1.1.1 | 0x00:12:34:56:78:9a | 100 |
| www.bbb.net/* | — | 100 | 50.1.1.1 | 0x00:bc:de:f0:12:34 | 200 |
| — | 20.30.40.50 | 200 | 60.1.1.1 | 0x00:98:76:54:32:10 | 200 |
| ... | ... | ... | ... | ... | ... |

| INPUT PACKET INFORMATION | | | TRANSFER METHOD | | | |
|---|---|---|---|---|---|---|
| DESTINATION IP ADDRESS | DESTINATION PORT No. | VLAN-ID | DESTINATION IP ADDRESS | DESTINATION PORT No. | DESTINATION MAC ADDRESS | OUTPUT PORT |
| 10.1.1.1 | 80, 8080 | 100 | 10.2.2.2 | — | 0x00:ab:da:32:45:67 | 1 |
| 20.2.2.2 | 7070 | 200 | — | 8080 | 0x00:da:cf:12:34:56 | 2 |
| ... | ... | ... | ... | ... | ... | ... |

| INPUT PACKET INFORMATION | | | TRANSFER METHOD | | | | | |
|---|---|---|---|---|---|---|---|---|
| DESTINATION IP ADDRESS | DESTINATION PORT No. | VLAN-ID | SOURCE IP ADDRESS | DESTINATION IP ADDRESS | DESTINATION PORT No. | DESTINATION MAC ADDRESS | VLAN-ID | MPLS LABEL |
| 20.1.1.1 | 8080 | 100 | — | 20.2.2.2 | — | 0x00:12:34:56:78:9a | 200 | |
| 30.1.1.1 | 7070 | 200 | 40.1.1.1 | 30.3.3.3 | 80 | 0x00:bc:de:f0:12:34 | — | |
| 40.1.1.1 | ARBITRARY | 100 | — | — | — | — | DELETED | 222 |
| ⋮ | ⋮ | ⋮ | ⋮ | ⋮ | ⋮ | ⋮ | ⋮ | ⋮ |

FIG 6

| RECEIVE PORT | EXTRACTED PACKET INFORMATION |
|---|---|
| 80 | URL, COOKIE |
| OTHER THAN 80 | DESTINATION IP ADDRESS, VLAN-ID |

| URL | INPUT PACKET INFORMATION | | | TRANSFER METHOD | | |
|---|---|---|---|---|---|---|
| | DESTINATION IP ADDRESS | VLAN-ID | SOURCE IP ADDRESS | DESTINATION MAC ADDRESS | VLAN-ID |
| www.aaa.com/* | — | — | 50.1.1.1 | 0x00:12:34:56:78:9a | 100 |
| www.bbb.net/* | — | 100 | 50.1.1.1 | 0x00:bc:de:f0:12:34 | 200 |
| — | 20.30.40.50 | 200 | 60.1.1.1 | 0x00:98:76:54:32:10 | 200 |
| ⋮ | ⋮ | ⋮ | ⋮ | ⋮ | ⋮ |

| INPUT PACKET INFORMATION | | | | TRANSFER METHOD | | | |
|---|---|---|---|---|---|---|---|
| URL | DESTINATION IP ADDRESS | VLAN-ID | SOURCE IP ADDRESS | DESTINATION IP ADDRESS | DESTINATION PORT No. | DESTINATION MAC ADDRESS | VLAN-ID |
| www.aaa.com/* | — | — | — | 20.2.2.2 | — | 0x00:12:34:56:78:9a | 200 |
| www.bbb.net/* | — | 100 | 40.1.1.1 | 30.3.3.3 | 80 | 0x00:bc:de:f0:12:34 | — |
| — | 20.30.40.50 | 200 | 60.1.2.3 | — | — | 0x00:98:76:54:32:10 | 300 |
| ... | ... | ... | ... | ... | ... | ... | ... |

| FQDN | IP ADDRESS |
|---|---|
| dstport-7070.dstip-20-1-1-1.vlan-100.resolve.org | 192.168.1.1 |
| dstport-7070.dstip-30-1-1-1.vlan-200.resolve.org | 192.168.2.2 |
| ... | ... |

104

| IP ADDRESS | FQDN |
|---|---|
| 192.168.1.1 | dstip-20-2-2-2.dstmac-00-12-34-56-78-0a.vlan-200.resolve.org |
| 192.168.2.2 | srcip-30-3-3-3.dstport-8080.dstmac-00-bc-de-f0-12-34.resolve.org |
| ... | ... |

| SERVICE | EXTRACTED PACKET INFORMATION |
|---|---|
| LAYER 2 SWITCH SERVICE | DESTINATION MAC ADDRESS, VLAN-ID |
| ROUTER SERVICE | DESTINATION IP ADDRESS |
| LAYER 4 SWITCH SERVICE | DESTINATION TCP/UDP PORT No., DESTINATION IP ADDRESS |
| LAYER 7 SWITCH SERVICE | URL, COOKIE, SOURCE IP ADDRESS |
| . . . | . . . |

| INPUT PACKET INFORMATION | | TRANSFER METHOD | | | |
|---|---|---|---|---|---|
| URL | RESOURCE REQUEST | URL | DESTINATION IP ADDRESS | DESTINATION MAC ADDRESS | user-priority |
| www.movie.org/aaa.fmt | IMPORTANCE PLACED ON WIDE DOWNSTREAM BAND | — | 20.2.2.2 | 0x00:12:34:56:78:9a | 7 |
| www.text.net/bbb.txt | IMPORTANCE PLACED ON LOW DELAY | www.text.net/ccc.txt | — | 0x00:bc:de:f0:12:34 | 5 |
| ... | ... | ... | ... | ... | ... |

| INPUT PACKET INFORMATION | | | | TRANSFER METHOD | | | |
|---|---|---|---|---|---|---|---|
| SOURCE IP ADDRESS | DESTINATION IP ADDRESS | VLAN-ID | SOURCE IP ADDRESS | MPLS LABEL | DESTINATION MAC ADDRESS | RESOURCE CONTROL | PASSAGE NODE |
| 40.4.4.4 | 70.7.7.7 | 100 | 10.4.4.4 | 123 | — | 10 Mbps ASSURANCE | A, B, C |
| 50.5.5.5 | 80.8.8.8 | 200 | — | 234 | — | PRIORITY FOR 5 Mbps | A, C, D |
| 60.5.5.5 | 90.9.9.9 | 200 | 10.6.6.6 | 345 | 0x00:23:45:67:89:ab | UNNECESSARY | — |
| ... | ... | ... | ... | ... | ... | ... | ... |

| INPUT PACKET INFORMATION | | TRANSFER METHOD | | | PACKET TRANSFER POLICY |
|---|---|---|---|---|---|
| URL | DESTINATION PORT No. | URL | DESTINATION IP ADDRESS | DESTINATION VLAN-ID | |
| www.portal.com | 80 | www.biglobe.net | 20.1.1.1 | 100 | TRANSFER WITH PRIORITY UP TO 1000 TIMES |
| www.abc.org | 8080 | www.xyz.com | 30.1.1.1 | — | TRANSFER AT PROBABILITY OF 60% |
| ... | ... | ... | ... | ... | ... |

FIG.22

| INPUT PACKET INFORMATION | | TRANSFER METHOD | | | |
|---|---|---|---|---|---|
| URL | DESTINATION PORT No. | URL | DESTINATION IP ADDRESS | DESTINATION VLAN-ID | SELECTION STANDARD |
| www.portal.com | 80 | www.biglobe.net | 20.1.1.1 | 100 | SELECTED WITH PRIORITY FOR 1,000 MORE TIMES |
| | | — | — | 100 | SELECTED IN DEFAULT SETTING |
| www.abc.org | 8080 | www.xyz.com | 30.1.1.1 | — | SELECTED WITH A WEIGHT OF 60% |
| | | — | — | 200 | SELECTED WITH A WEIGHT OF 40% |
| ... | | ... | ... | ... | ... |

| TYPE OF INFORMATION CONTAINED IN PACKET / TYPE OF INFORMATION RELATED TO TRANSFER METHOD | 1 TYPE (FIXED) | 1 TYPE (DETERMINED FOR EACH PACKET) | SEVERAL TYPES (FIXED) | SEVERAL TYPES (DETERMINED FOR EACH PACKET) |
|---|---|---|---|---|
| 1 TYPE (FIXED) | A | E | I | M |
| 1 TYPE (DETERMINED FOR EACH PACKET) | B | F | J | N |
| SEVERAL TYPES (FIXED) | C | G | K | O |
| SEVERAL TYPES (DETERMINED FOR EACH PACKET) | D | H | L | P |

SYSTEM AND METHOD FOR EXTERNAL RESOLUTION OF PACKET TRANSFER INFORMATION

BACKGROUNDS OF THE INVENTION

1. Field of the Invention

The present invention relates to a packet transfer equipment and a server, and particularly relates to a packet transfer equipment that transfers the packet based on the information contained in the received packet and a server to resolve the transfer method for the packet based on the information contained in the packet.

2. Description of the Related Art

Packet transfer equipments that transfer the received packet based on the information contained in such packet include the following equipments in case of those currently used in the IP (Internet Protocol) network, for example:

(i) Layer 2 switch that determines the packet transfer method using the information contained in the MAC header (such as destination MAC address and VLAN-ID);

(ii) Layer 3 switch or a router that determines the packet transfer method using the information contained in the IP header (such as the destination IP address);

(iii) Layer 4 switch that decides the packet transfer method using the information contained in the IP header and the TCP/UDP header (such as the port No.); and (iv) Layer 7 switch that determines the packet transfer method using the information (such as URL (Universal Resource Locator) and Cookie) contained in the application level header (such as the HTTP (HyperText Transport Protocol) header and the RTSP (Real Time Streaming Protocol) header).

These packet transfer equipments need the information about correspondence between the information contained in the received packet and the packet transfer method in order to determine the transfer method for the received packet. Conventional packet transfer equipments use three methods as follows to obtain such information:

(a) To use the information statically set inside of the packet transfer equipment by command line interface (CLI), NMS (Network Management Server) or the like;

(b) To use the information dynamically advertised to the packet transfer equipment using the information advertised from other node by the routing protocol or the like, and (c) To make an inquiry to an external server.

The present invention improves the method (c) among these methods.

Conventional examples in which a packet transfer equipment inquires of an external server about the correspondence information between the information contained in the received packet and the transfer method for such packet include the "proxy arp" method by which the MAC address corresponding to a certain IP address is inquired of the router and a method by which the web proxy server inquires of the DNS (Domain Name System) server about the IP address of the corresponding server based on the FQDN (Fully Qualified Domain Name) of the URL contained in the HTTP request from the user.

According to the prior arts, the packet transfer method may be asked to an external server by the proxy arp method or by the inquiry of the DNS server from the web proxy server as described above. However, these methods only make a one-to-one conversion in which one piece of information in a particular field contained in the packet to another piece of information in a particular fixed field. Specifically, the proxy arp method converts the IP address to the MAC address and the web proxy server converts the FQDN to the IP address. They just serve for resolution of the limited one-to-one correspondence.

FIG. 23 is a matrix showing combinations between the types of information contained in the packet and the types of information related to the transfer method. In the columns classifying the types of information contained in the packet, the column "1 type (Fixed)" represents that one predetermined type of information is used as the key to find the transfer method regardless of the received packet. The column "1 type (determined for each packet)" represents that only one type of information is used as a key, but such type is determined for each received packet. The column "Several types (Fixed)" shows that several predetermined types of information are used as the keys regardless of the received packet. The column "Several types (Determined for each packet)" represents that there are several types of information used as the keys and that such several types are determined for each received packet. Further, in the lines classifying the types of information related to the transfer method, the line "1 type (Fixed)" represents that one predetermined type of information is used for resolution as the information related to the transfer method regardless of the received packet and the line "1 type (Determined for each packet)" shows that the information for resolution is one type, but that type is determined for each received packet. The line "Several types (Fixed)" shows that several predetermined types of information are used for resolution as the information related to the transfer method regardless of the received packet and the line "Several types (determined for each packet)" shows that there are several types of information for resolution and such several types are determined for each packet.

The proxy arp method and the conventional method using a web proxy server with inquiring of an external server about the packet transfer method correspond to the combination at A in the matrix of FIG. 23. Correspondence expressed by combinations at B to P other than A cannot be resolved using an external server according to the prior art. Specifically, the following correspondences cannot be resolved.

(1) Several arbitrary types of information contained in the received packet are used as the key to resolve one or more arbitrary type of information related to the packet transfer method (I to P). For example, using both the destination port number and the destination MAC address as the keys, the destination port number and the destination MAC address after conversion are resolved.

(2) One type of information contained in the received packet is used as the key, but the type of the key information is determined for each received packet (E to H). For example, the URL is rewritten using the URL as the key in a certain received packet and the MAC address is rewritten using the IP address as the key in another received packet.

(3) Using one fixed type of information contained in the received packet as the key, several arbitrary types of information related to the transfer method of that packet is resolved (C and D). For example, using the URL as the key, the URL after rewriting and the vlan tag to be added are resolved.

(4) Using one fixed type of information contained in the received packet as the key, one type of information related to the transfer method of that packet is resolved, but the type of the resolved information is decided for each received packet (B). For example, though the URL is used as the key for both cases, the URL after rewriting is resolved in a certain received packet and the MAC address is resolved in another received packet.

(5) Arbitrary combination of (1) to (4) above. For example, when there are two types of packets (Packet A and Packet B), the destination port No. and the destination MAC address are rewritten before transfer in case of packet A, but the URL is rewritten and the vlan tag is added before transfer in case of packet B.

To resolve the correspondence as in (1) to (5) described above, there is no other method than to statically set a resolution inside of the packet transfer equipment using CLI or NMS instead of an external server according to the prior art. By this method, however, it is necessary to set the packet transfer method for each packet transfer equipment and the packet transfer equipments cannot be managed collectively.

In addition, even if the transfer methods for correspondences (1) to (5) as described above are resolved by inquiry of an external server, it is necessary to provide a server for each type of information processing method. It is necessary to have a server to resolve the rewriting method of the destination port number, a server to resolve the rewriting method of the destination MAC address, a server to resolve the URL rewriting method, a server to resolve the method for vlan tag addition and so on. It is substantially impossible to actually have so many servers. It is further difficult to set a different transfer method for each packet.

SUMMARY OF THE INVENTION

A first object of the present invention is to provide a packet transfer equipment that can resolve the correspondences (1) to (5) as described above using an external server and can transfer the received packet to another node.

A second object of the present invention is to provide a server that can reply to inquiries about the correspondences (1) to (5) as described above from the packet transfer equipment that transfers the received packet to another node.

According to the first aspect of the invention, a packet transfer equipment that transfers the received packet to another node characterized by that the packet transfer equipment specifies several types of information contained in the received packet, inquires of an external server about one or more type of information related to the transfer method of the received packet and resolves the transfer method of the received packet according to one or more type of information obtained.

According to another aspect of the invention, a packet transfer equipment that transfers the received packet to another node characterized by that the packet transfer equipment specifies one or more type of information in the received packet that is determined for each of the received packet, inquires of an external server about one or more type of information related to the transfer method of the received packet and resolves the transfer method of the received packet according to one or more type of information obtained.

According to another aspect of the invention, a packet transfer equipment that transfers the received packet to another node characterized by that the packet transfer equipment specifies one or more type of information in the received packet, inquires of an external server about several types of information related to the transfer method of the received packet and resolves the transfer method of the received packet according to several types of information obtained.

According to another aspect of the invention, a packet transfer equipment that transfers the received packet to another node characterized by that the packet transfer equipment specifies one or more type of information contained in the received packet, inquires of an external server about one or more type of information related to the transfer method of the received packet that is determined for each of the received packet and resolves the transfer method of the received packet according to one or more type of information obtained.

According to another aspect of the invention, a packet transfer equipment that transfers the received packet to another node comprising a packet information extraction section that extracts several types of information contained in the received packet, and a packet transfer method resolution section that specifies the several types of information extracted by the packet information extraction section and inquires of an external server about one or more type of information related to the transfer method of the received packet and resolves the transfer method of the received packet according to one or more type of information obtained.

According to another aspect of the invention, a packet transfer equipment that transfers the received packet to another node comprising a packet information extraction section that extracts one or more type of information contained in the received packet that is determined for each of the received packet, and a packet transfer method resolution section that specifies the one or more type of information extracted by the packet information extraction section, inquires of an external server about one or more type of information related to the transfer method of the received packet and resolves the transfer method of the received packet according to one or more type of information obtained.

According to another aspect of the invention, a packet transfer equipment that transfers the received packet to another node comprising a packet information extraction section that extracts one or more type of information contained in the received packet, and a packet transfer method resolution section that specifies the one or more type of information extracted by the packet information extraction section, inquires of an external server about several types of information related to the transfer method of the received packet and resolves the transfer method of the received packet according to several types of information obtained.

According to another aspect of the invention, a packet transfer equipment that transfers the received packet to another node comprising a packet information extraction section that extracts one or more type of information contained in the received packet and a packet transfer method resolution section that specifies the one or more type of information extracted by the packet information extraction section, inquires of an external server about one or more type of information related to the transfer method of the received packet that is determined for each of the received packet and resolves the transfer method of the received packet according to one or more information obtained.

According to another aspect of the invention, a packet transfer method resolution server characterized by that, upon a request from the packet transfer equipment that transfers the received packet to another node inquiring the information related to the transfer method of the received packet and specifying several types of information contained in the received packet, one or more type of information related to the transfer method of the received packet is replied to the packet transfer equipment.

According to another aspect of the invention, a packet transfer method resolution server characterized by that, upon a request from the packet transfer equipment that transfers the received packet to another node inquiring the information related to the transfer method of the received packet and specifying one or more type of information contained in the received packet that is determined for each of the received packet, one or more type of information related to the transfer method of the received packet is replied to the packet transfer equipment.

According to another aspect of the invention, a packet transfer method resolution server characterized by that, upon a request from the packet transfer equipment that transfers the received packet to another node inquiring the information related to the transfer method of the received packet and specifying one or more type of information contained in the received packet, several types of information related to the transfer method of the received packet are replied to the packet transfer equipment.

According to another aspect of the invention, a packet transfer method resolution server characterized by that, upon a request from the packet transfer equipment that transfers the received packet to another node inquiring the information related to the transfer method of the received packet and specifying one or more type of information contained in the received packet, one or more type of information related to the transfer method of the received packet that is determined for each of the received packet is replied to the packet transfer equipment.

According to another aspect of the invention, a packet transfer method resolution server comprising a packet transfer method database where the correspondences between several types of information contained in the packet and one or more type of information related to the packet transfer method are registered, and a packet transfer method resolution request acceptance section that accepts the packet transfer method resolution request from the packet transfer equipment that transfers the received packet to another node inquiring the information related to the transfer method of the received packet and specifying several types of information contained in the received packet, refers to the packet transfer method database and replies one or more type of information related to the transfer method of the received packet to the packet transfer equipment.

According to another aspect of the invention, a packet transfer method resolution server comprising a packet transfer method database where the correspondences between one or more type of information contained in the packet and one or more type of information related to the packet transfer method are registered, and a packet transfer method resolution request acceptance section that accepts the packet transfer method resolution request from the packet transfer equipment that transfers the received packet to another node inquiring the information related to the transfer method of the received packet and specifying one or more type of information contained in the received packet that is determined for each of the received packet, refers to the packet transfer method database and replies, to the packet transfer equipment, one or more type of information related to the transfer method of the received packet.

According to another aspect of the invention, a packet transfer method resolution server comprising a packet transfer method database where the correspondences between one or more type of information contained in the packet and several types of information related to the packet transfer method are registered, and a packet transfer method resolution request acceptance section that accepts the packet transfer method resolution request from the packet transfer equipment that transfers the received packet to another node inquiring the information related to the transfer method of the received packet and specifying one or more type of information contained in the received packet, refers to the packet transfer method database and replies, to the packet transfer equipment, several types of information related to the transfer method of the received packet.

According to another aspect of the invention, a packet transfer method resolution server comprising a packet transfer method database where the correspondences between one or more type of information contained in the packet and one or more type of information related to the packet transfer method are registered, and a packet transfer method resolution request acceptance section that accepts the packet transfer method resolution request from the packet transfer equipment that transfers the received packet to another node inquiring the information related to the transfer method of the received packet and specifying one or more type of information contained in the received packet, refers to the packet transfer method database and replies, to the packet transfer equipment, one or more type of information related to the transfer method of the received packet that is determined for each of the received packet.

According to another aspect of the invention, a DNS server comprising an IP address/FQDN correspondence database having the IP address corresponding to the FQDN and the FQDN corresponding to the IP address registered where the FQDN or the IP address in the packet transfer equipment that transfers the received packet to another node uniquely indicating several types of information contained in the received packet and the FQDN or the IP address uniquely indicating one or more type of information related to the transfer method of the received packet are associated, and a DNS resolution request acceptance section that accepts the IP address resolution request inquiring the IP address corresponding to the FQDN from the packet transfer equipment that transfers the received packet to another node, refers to the IP address/FQDN correspondence database and replies the IP address corresponding to the FQDN to the packet transfer equipment as well as accepts the FQDN resolution request inquiring the FQDN corresponding to the IP address from the packet transfer equipment, refers to the IP address/FQDN correspondence database and replies the FQDN corresponding to the IP address to the packet transfer equipment.

According to another aspect of the invention, a DNS server comprising an IP address/FQDN correspondence database having the IP address corresponding to the FQDN and the FQDN corresponding to the IP address registered where the FQDN or the IP address in the packet transfer equipment that transfers the received packet to another node uniquely indicating one or more type of information in the received packet determined for each of the received packet and the FQDN or the IP address uniquely indicating one or more type of information related to the transfer method of the received packet are associated, and a DNS resolution request acceptance section that accepts the IP address resolution request inquiring the IP address corresponding to the FQDN from the packet transfer equipment that transfers the received packet to another node, refers to the IP address/FQDN correspondence database and replies the IP address corresponding to the FQDN to the packet transfer equipment as well as accepts the FQDN resolution request inquiring the FQDN corresponding to the IP address from the packet transfer equipment, refers to the IP address/FQDN correspondence database and replies the FQDN corresponding to the IP address to the packet transfer equipment.

According to another aspect of the invention, a DNS server comprising an IP address/FQDN correspondence database having the IP address corresponding to the FQDN and the FQDN corresponding to the IP address registered where the FQDN or the IP address in the packet transfer equipment that transfers the received packet to another node uniquely indicating one or more type of information in the received packet and the FQDN or the IP address uniquely indicating several types of information related to the transfer method of the received packet are associated, and a DNS resolution request acceptance section that accepts the IP address resolution request inquiring the IP address corresponding to the FQDN from the packet transfer equipment that transfers the received packet to another node, refers to the IP address/FQDN correspondence database and replies the IP address corresponding to the FQDN to the packet transfer equipment as well as accepts the FQDN resolution request inquiring the FQDN corresponding to the IP address from the packet transfer equipment, refers to the IP address/FQDN correspondence database and replies the FQDN corresponding to the IP address to the packet transfer equipment.

According to another aspect of the invention, a DNS server comprising an IP address/FQDN correspondence database having the IP address corresponding to the FQDN and the FQDN corresponding to the IP address registered where the FQDN or the IP address in the packet transfer equipment that transfers the received packet to another node uniquely indicating one or more type of information in the received packet and the FQDN or the IP address uniquely indicating one or more type of information determined for each of the received packet related to the transfer method of the received packet are associated, and a DNS resolution request acceptance section that accepts the IP address resolution request inquiring the IP address corresponding to the FQDN from the packet transfer equipment that transfers the received packet to another node, refers to the IP address/FQDN correspondence database and replies the IP address corresponding to the FQDN to the packet transfer equipment as well as accepts the FQDN resolution request inquiring the FQDN corresponding to the IP address from the packet transfer equipment, refers to the IP address/FQDN correspondence database and replies the FQDN corresponding to the IP address to the packet transfer equipment.

According to another aspect of the invention, a network system comprising a packet transfer equipment and a packet transfer method resolution server or a DNS server, and characterized by that the policy to guide the request packet from the user requesting contents or application services to the server of a particular provider is described in the packet transfer method resolution server or the DNS server.

According to another aspect of the invention, a network system comprising a packet transfer equipment and a packet transfer method resolution server or a DNS server, and characterized by that the policy to execute the transfer control of the request packet from the user requesting the contents or application services provided by the contents or application service provider based on the context information of the user is described in the packet transfer method resolution server or the DNS server.

According to another aspect of the invention, a program to have a computer function as a packet transfer equipment that transfers the received packet to another node comprising a packet information extraction function to extract several types of information contained in the received packet, and a packet transfer method resolution function that inquires of an external server about one or more type of information related to the transfer method of the received packet with specifying the several types of extracted information and resolves the transfer method of the received packet according to one or more type of information obtained.

According to another aspect of the invention, a program to have a computer function as a packet transfer equipment that transfers the received packet to another node comprising a packet information extraction function to extract one or more type of information in the received packet determined for each of the received packet and a packet transfer method resolution function that inquires of an external server about one or more type of information related to the transfer method of the received packet with specifying the one or more type of extracted information and resolves the transfer method of the received packet according to one or more type of information obtained.

According to another aspect of the invention, a program to have a computer function as a packet transfer equipment that transfers the received packet to another node comprising a packet information extraction function to extract one or more type of information contained in the received packet, and a packet transfer method resolution function that inquires of an external server about several types of information related to the transfer method of the received packet with specifying the one or more type of extracted information and resolves the transfer method of the received packet according to several types of information obtained.

According to another aspect of the invention, a program to have a computer function as a packet transfer equipment that transfers the received packet to another node comprising a packet information extraction function to extract one or more type of information contained in the received packet, and a packet transfer method resolution function that inquires of an external server about one or more type of information related to the transfer method of the received packet that is determined for each of the received packet with specifying the one or more type of extracted information and resolves the transfer method of the received packet according to one or more type of information obtained.

According to another aspect of the invention, a program to have a computer function as a packet transfer method resolution server provided with a packet transfer method database where the correspondences between several types of information contained in the packet and one or more type of information related to the packet transfer method are registered comprising a packet transfer method resolution request acceptance function that accepts the packet transfer method resolution request from the packet transfer equipment that transfers the received packet to another node inquiring the information related to the transfer method of the received packet and specifying several types of information contained in the received packet, refers to the packet transfer method database and replies to the packet transfer equipment one or more type of information related to the transfer method of the received packet.

According to another aspect of the invention, a program to have a computer function as a packet transfer method resolution server provided with a packet transfer method database where the correspondences between one or more type of information contained in the packet and one or more type of information related to the packet transfer method are registered comprising a packet transfer method resolution request acceptance function that accepts the packet transfer method resolution request from the packet transfer equipment that transfers the received packet to another node inquiring the information related to the transfer method of the received packet and specifying one or more type of information in the received packet determined for each of the received packet, refers to the packet transfer method database and replies to the packet transfer equipment one or more type of information related to the transfer method of the received packet.

According to another aspect of the invention, a program to have a computer function as a packet transfer method resolution server provided with a packet transfer method database where the correspondences between one or more type of information contained in the packet and several types of information related to the packet transfer method are registered comprising a packet transfer method resolution request acceptance function that accepts the packet transfer method resolution request from the packet transfer equipment that transfers the received packet to another node inquiring the information related to the transfer method of the received packet and specifying one or more type of information contained in the received packet, refers to the packet transfer method database and replies several types of information related to the transfer method of the received packet to the packet transfer equipment.

According to another aspect of the invention, a program to have a computer function as a packet transfer method resolution server provided with a packet transfer method database where the correspondences between one or more type of information contained in the packet and one or more type of information related to the packet transfer method are registered comprising a packet transfer method resolution request acceptance function that accepts the packet transfer method resolution request from the packet transfer equipment that transfers the received packet to another node inquiring the information related to the transfer method of the received packet and specifying one or more type of information in the received packet, refers to the packet transfer method database and replies to the packet transfer equipment one or more type of information related to the transfer method of the received packet that is determined for each of the received packet.

According to another aspect of the invention, a program to have a computer function as a DNS server provided with an IP address/FQDN correspondence database where the IP address corresponding to the FQDN and the FQDN corresponding to the IP address are registered and the FQDN or the IP address in the packet transfer equipment that transfers the received packet to another node uniquely indicating several types of information contained in the received packet and the FQDN or the IP address uniquely indicating one or more type of information related to the transfer method of the received packet are associated comprising a function that accepts the IP address resolution request inquiring the IP address corresponding to the FQDN from the packet transfer equipment that transfers the received packet to another node, refers to the IP address/FQDN correspondence database and replies the IP address corresponding to the FQDN to the packet transfer equipment, and a function that accepts the FQDN resolution request inquiring the FQDN corresponding to the IP address from the packet transfer equipment, refers to the IP address/FQDN correspondence database and replies the FQDN corresponding to the IP address to the packet transfer equipment.

According to another aspect of the invention, a program to have a computer function as a DNS server provided with an IP address/FQDN correspondence database where the IP address corresponding to the FQDN and the FQDN corresponding to the IP address are registered and the FQDN or the IP address in the packet transfer equipment that transfers the received packet to another node uniquely indicating one or more type of information in the received packet determined for each of the received packet and the FQDN or the IP address uniquely indicating one or more type of information related to the transfer method of the received packet are associated comprising a function that accepts the IP address resolution request inquiring the IP address corresponding to the FQDN from the packet transfer equipment that transfers the received packet to another node, refers to the IP address/FQDN correspondence database and replies the IP address corresponding to the FQDN to the packet transfer equipment, and a function that accepts the FQDN resolution request inquiring the FQDN corresponding to the IP address from the packet transfer equipment, refers to the IP address/FQDN correspondence database and replies the FQDN corresponding to the IP address to the packet transfer equipment.

According to another aspect of the invention, a program to have a computer function as a DNS server provided with an IP address/FQDN correspondence database where the IP address corresponding to the FQDN and the FQDN corresponding to the IP address are registered and the FQDN or the IP address in the packet transfer equipment that transfers the received packet to another node uniquely indicating one or more type of information contained in the received packet and the FQDN or the IP address uniquely indicating several types of information related to the transfer method of the received packet are associated comprising a function that accepts the IP address resolution request inquiring the IP address corresponding to the FQDN from the packet transfer equipment that transfers the received packet to another node, refers to the IP address/FQDN correspondence database and replies the IP address corresponding to the FQDN to the packet transfer equipment, and a function that accepts the FQDN resolution request inquiring the FQDN corresponding to the IP address from the packet transfer equipment, refers to the IP address/FQDN correspondence database and replies the FQDN corresponding to the IP address to the packet transfer equipment.

According to another aspect of the invention, a program to have a computer function as a DNS server provided with an IP address/FQDN correspondence database where the IP address corresponding to the FQDN and the FQDN corresponding to the IP address are registered and the FQDN or the IP address in the packet transfer equipment that transfers the received packet to another node uniquely indicating one or more type of information contained in the received packet and the FQDN or the IP address uniquely indicating one or more type of information related to the transfer method of the received packet that is determined for each of the received packet are associated comprising a function that accepts the IP address resolution request inquiring the IP address corresponding to the FQDN from the packet transfer equipment that transfers the received packet to another node, refers to the IP address/FQDN correspondence database and replies the IP address corresponding to the FQDN to the packet transfer equipment, and a function that accepts the FQDN resolution request inquiring the FQDN corresponding to the IP address from the packet transfer equipment, refers to the IP address/FQDN correspondence database and replies the FQDN corresponding to the IP address to the packet transfer equipment.

Thus, it becomes possible to use several types of information contained in the received packet as the key so as to resolve one or more type of information related to the transfer method of that packet and to execute the transfer.

Thus, it becomes possible to use one or more type of information determined for each received packet as the key so as to resolve one or more type of information related to the transfer method of that packet and to execute the transfer.

Thus, it becomes possible to use one type of information contained in the received packet as the key so as to resolve several types of information related to the transfer method of that packet and to execute the transfer.

Thus, it becomes possible to use one or more type of information contained in the received packet as the key so as to resolve one or more type of information related to the transfer method of that packet that is determined for each received packet and to execute the transfer.

In the packet transfer equipment according to the present invention comprising of a packet transfer method storage table to temporarily store the information related to the packet transfer method resolved by the packet transfer method resolution section, it becomes unnecessary to inquire of an external server about the information related to the transfer method of the received packet every time and thus it becomes possible to effectively transfer the received packet.

Thus, it becomes possible to reply to the inquiry from the packet transfer equipment using several types of information contained in the received packet as the key by providing one or more type of information related to the transfer method of that packet.

Thus, it becomes possible to reply to the inquiry from the packet transfer equipment using one or more type of information determined for each received packet as the key by providing one or more type of information related to the transfer method of that packet.

Thus, it becomes possible to reply to the inquiry from the packet transfer equipment using one or more type of information contained in the received packet as the key by providing several types of information related to the transfer method of that packet.

Thus, it becomes possible to reply to the inquiry from the packet transfer equipment using one or more type of information contained in the received packet as the key by providing one or more type of information related to the transfer method of that packet that is determined for each received packet.

Thus, it becomes possible to reply to the inquiry from the packet transfer equipment using the FQDN or the IP address uniquely indicating several types of information contained in the received packet as the key by providing the FQDN or the IP address uniquely indicating one or more type of information related to the transfer method of that packet.

Thus, it becomes possible to reply to the inquiry from the packet transfer equipment using the FQDN or the IP address uniquely indicating one or more type of information determined for each received packet as the key by providing the FQDN or the IP address uniquely indicating one or more information related to the transfer method of that packet.

Thus, it becomes possible to reply to the inquiry from the packet transfer equipment using the FQDN or the IP address uniquely indicating one or more type of information contained in the received packet as the key by providing the FQDN or the IP address uniquely indicating several types of information related to the transfer method of that packet.

Thus, it becomes possible to reply to the inquiry from the packet transfer equipment using the FQDN or the IP address uniquely indicating one or more type of information contained in the received packet as the key by providing the FQDN or the IP address uniquely indicating one or more type of information related to the transfer method of that packet that is determined for each packet.

Other objects, features and advantages of the present invention will become clear from the detailed description given herebelow.

BRIEF DESCRIPTION OF THE DRAWINGS the present invention will be understood more fully from the detailed description given herebelow and from the accompanying drawings of the preferred embodiment of the invention, which, however, should not be taken to be limitative to the invention, but are for explanation and understanding only.

in the drawings:

FIG. 2 is a diagram showing an example of entries to the packet transfer method storage table according to the first embodiment of the present invention;

FIG. 3 is a diagram showing an example of entries to the packet transfer method database according to the first embodiment of the present invention;

FIG. 6 is a diagram showing an example of entries to the extracted packet information correspondence table according to the first embodiment of the present invention;

FIG. 7 is a diagram showing another example of entries to the packet transfer method database according to the first embodiment of the present invention;

FIG. 8 is a diagram showing still another example of entries to the packet transfer method database according to the first embodiment of the present invention;

FIG. 10 is a diagram showing an example of entries to the IP address/FQDN correspondence database according to the second embodiment of the present invention;

FIG. 14 is a diagram showing an example of conversions executed at the extracted packet information conversion section according to the third embodiment of the present invention;

FIG. 16 is a diagram showing an example of entry rewriting in the packet transfer method database executed by an entry rewriting section according to the fourth embodiment of the present invention;

FIG. 18 is a diagram showing an example of entries to the packet transfer method database according to the fifth embodiment of the present invention;

FIG. 21 is a diagram showing an example of the packet transfer policies described in the packet transfer policy description section according to the sixth embodiment of the present invention;

FIG. 22 is a diagram showing an example of entries to the packet transfer method database according to the sixth embodiment of the present invention; and FIG. 23 is a matrix showing the combinations between the types of information contained in the packet and the types of information related to the transfer method.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment of the Invention

Next, referring to the attached figures, a first embodiment of the present invention is described in details below.

Figure 1:
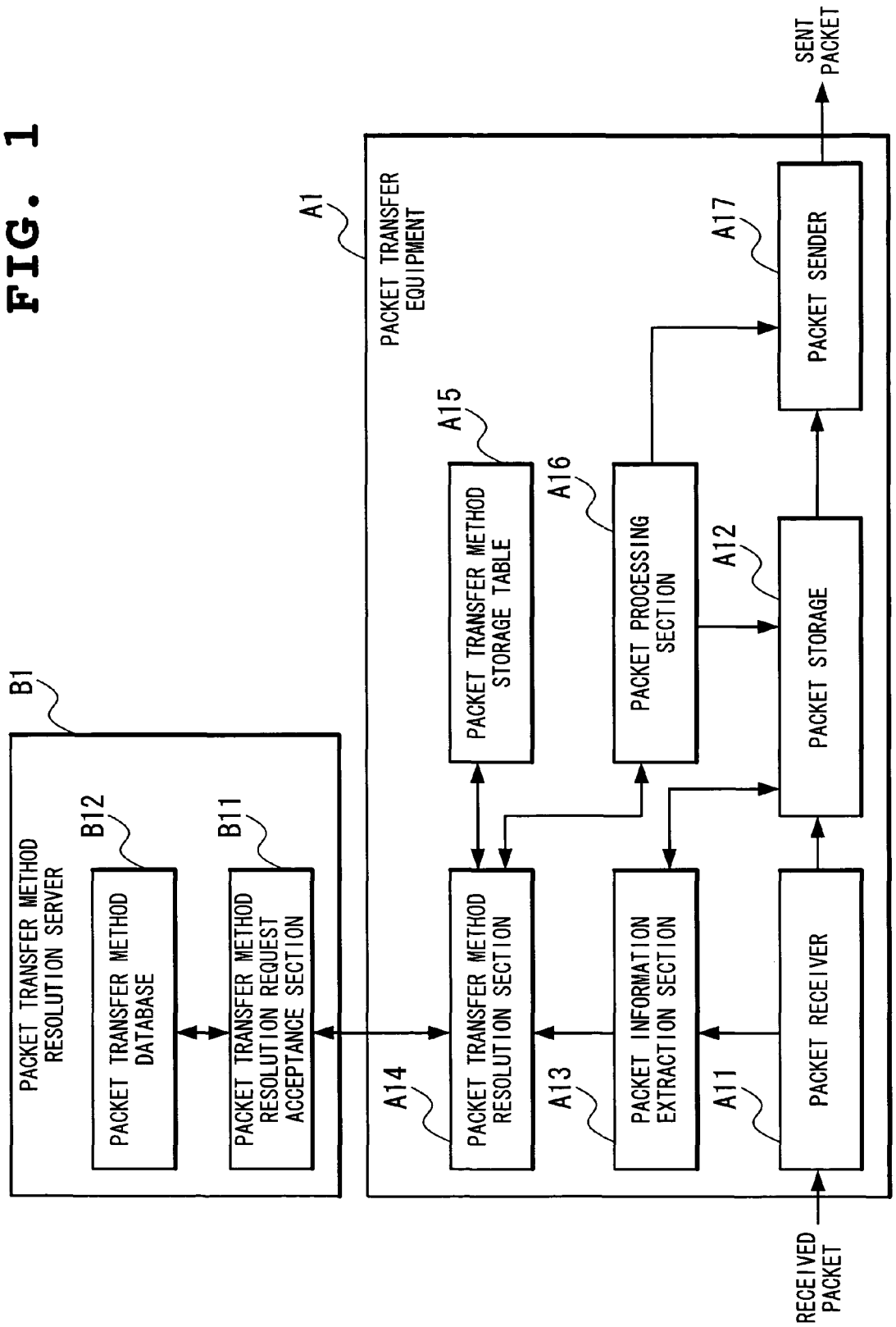
FIG. 1 is a block diagram showing the configuration of a first embodiment according to the present invention.

Referring to FIG. 1, the first embodiment of the present invention is achieved by a packet transfer equipment A1 and a packet transfer method resolution server B1.

The packet transfer equipment A1 comprises a packet receiver A11, a packet storage A12, a packet information extraction section A13, a packet transfer method resolution section A14, a packet transfer method storage table A15, a packet processing section A16 and a packet sender A17.

The packet receiver A11 receives the packet sent by other node and once stores the received packet to the packet storage A12. Then, it sends the signal to indicate that it has received a packet to the packet information extraction section A13.

The packet storage A12 is a storage which, until the packet received by the packet receiver A11 is sent by the packet sender A17, temporarily stores the packet.

The packet information extraction section A13 is triggered by receiving of the signal from the packet receiver A11 that indicates receiving of a packet and extracts the information contained in the packet stored in the packet storage A12. In case of this embodiment, the packet information extraction section A13 extracts one or more types of predetermined information in the received packet. Examples of information extracted here include the URL, TCP/UDP port number, source/destination IP address, VLAN-ID and source/destination MAC address. The information extracted here is not necessarily contained in one packet. The information obtained from the data generated through synthesis of two or more packets is also included. For example, the URL and the Cookie, which are application layer information, may be encoded over several packets on the TCP connection. In this case, it is necessary to once terminate the applicable TCP connection at the packet transfer equipment A1 and to extract the URL and the Cookie. In addition, the extracted information is not necessarily of one type. Two types of information over several layers such as "URL and VLAN-ID" may be extracted. In other words, one or more fixed type of information is extracted from the received packet and used as the key to resolve the transfer method for that packet. The packet information extraction section A13 passes the extracted information to the packet transfer method resolution section A14.

The packet transfer method resolution section A14 resolves the problem about how to process and transfer the received packet according to the information passed from the packet information extraction section A13. In this embodiment, there are two resolution methods: To search entries stored in the packet transfer method storage table A15 or to make an inquiry by sending the packet transfer method resolution request to the packet transfer method resolution server B1. The packet transfer method resolution request to the packet transfer method resolution server B1 may contain the information passed from the packet information extraction section A13 as the key. The packet transfer method resolved as described above is passed to the packet processing section A16.

The packet transfer method storage table A15 has entries showing the correspondence between the information contained in the packet and the transfer method for that packet registered. For example, a packet transfer method storage table 101 in FIG. 2 describes the packet transfer method when the types of information contained in the packet are "Destination port No., Destination IP Address and VLAN-ID". The first entry shows that the packet with the destination IP address 10.1.1.1, the destination port No. 80 or 8080 and the vlan-ID 100 is rewritten so as to have the destination ID address 10.2.2.2 and the destination MAC address 0x00:ab:da:32:45:67 and sent from an output port 1. The second entry shows that the packet with the destination IP address 20.2.2.2, the destination port No. 7070 and the vlan-ID 200 is rewritten to have the destination port No. 8080 and the destination MAC address 0x00:da:cf:12:34:56 and sent from an output port 2. In other words, this embodiment resolves the information related to the transfer method of different types corresponding to the received packet. The packet transfer method storage table A15 is used to store the packet transfer method registered by setting to the packet transfer equipment A1 itself or to temporarily cache the packet transfer method resolved by inquiry of the packet transfer method resolution server B1, but the packet transfer equipment A1 may be configured without any packet transfer method storage table A15. In this case, the packet transfer method resolution section A14 resolves the packet transfer method from the packet transfer method resolution server B1.

The packet processing section A16 processes the received packet stored in the packet storage A12 according to the packet transfer method resolved by the packet transfer method resolution section A14. For example, in case of the packet corresponding to the second entry to the packet transfer method storage table 101, the destination port No. of the received packet is rewritten from 7070 to 8080 and its destination MAC address is rewritten to 0x00:da:cf:12:34:56. In addition, it also executes other processes not indicated directly in the packet transfer method resolved by the packet transfer method resolution section A14 (Rewriting of TTL (Time To Live) field, check sum field and so on in the IP header, for example) as required. After the packet processing, it sends the signal to request sending of the processed packet to the packet sender A17.

When the packet sender A17 receives the signal to request packet sending from the packet processing section A16, it reads out the applicable packet from the packet storage A12 and sends it to another node.

On the other hand, the packet transfer method resolution server B1 comprises a packet transfer method resolution request acceptance section B11 and a packet transfer method database B12.

The packet transfer method resolution request acceptance section B11 receives the resolution request for the packet transfer method from the packet transfer equipment A1, searches the packet transfer method database B12 for the packet transfer method to be replied to such resolution request and makes a reply to the packet transfer equipment A1.

The packet transfer method database B12 has entries showing the correspondence between the information contained in the packet and the transfer method for that packet registered. For example, as in the case shown by a packet transfer method database 102 in FIG. 3, it has description about the packet transfer method when the types of the information contained in the packet are "Destination port No., Destination IP address and vlan-ID". In the first entry, the packet having the destination IP address 20.1.1.1 and the destination port No. 8080 and the vlan-ID 100 is rewritten to have the destination IP address 20.2.2.2, the destination MAC address 0x00:12:34:56:78:9a and the vlan-ID 200 and then transferred. Further, the second entry shows a transfer method in which the packet having the destination IP address 30.1.1.1 and the destination port No. 7070 and the vlan-ID 200 is rewritten to have the source IP address 40.1.1.1, the destination IP address 30.3.3.3, the destination port No. 80 and the destination MAC address 0x00:bc:de:f0:12:34. This means rewriting of the fields different from those rewritten in the first transfer method. In other words, the information related to different types of transfer methods corresponding to the received packet is resolved. Further, the third entry indicates that, for the packet with the destination IP address 40.1.1.1, an arbitrary destination port No. and the vlan-ID 100, the label 222 is added to the MPLS label field and the vlan-ID is deleted. Thus, the processing method for rewriting, addition and deletion in arbitrary fields of the received packet are described. In addition, by specifying the rewriting or addition method for the destination IP address and the MPLS label of the received packet, the transfer route of the applicable packet is controlled.

Figure 4:
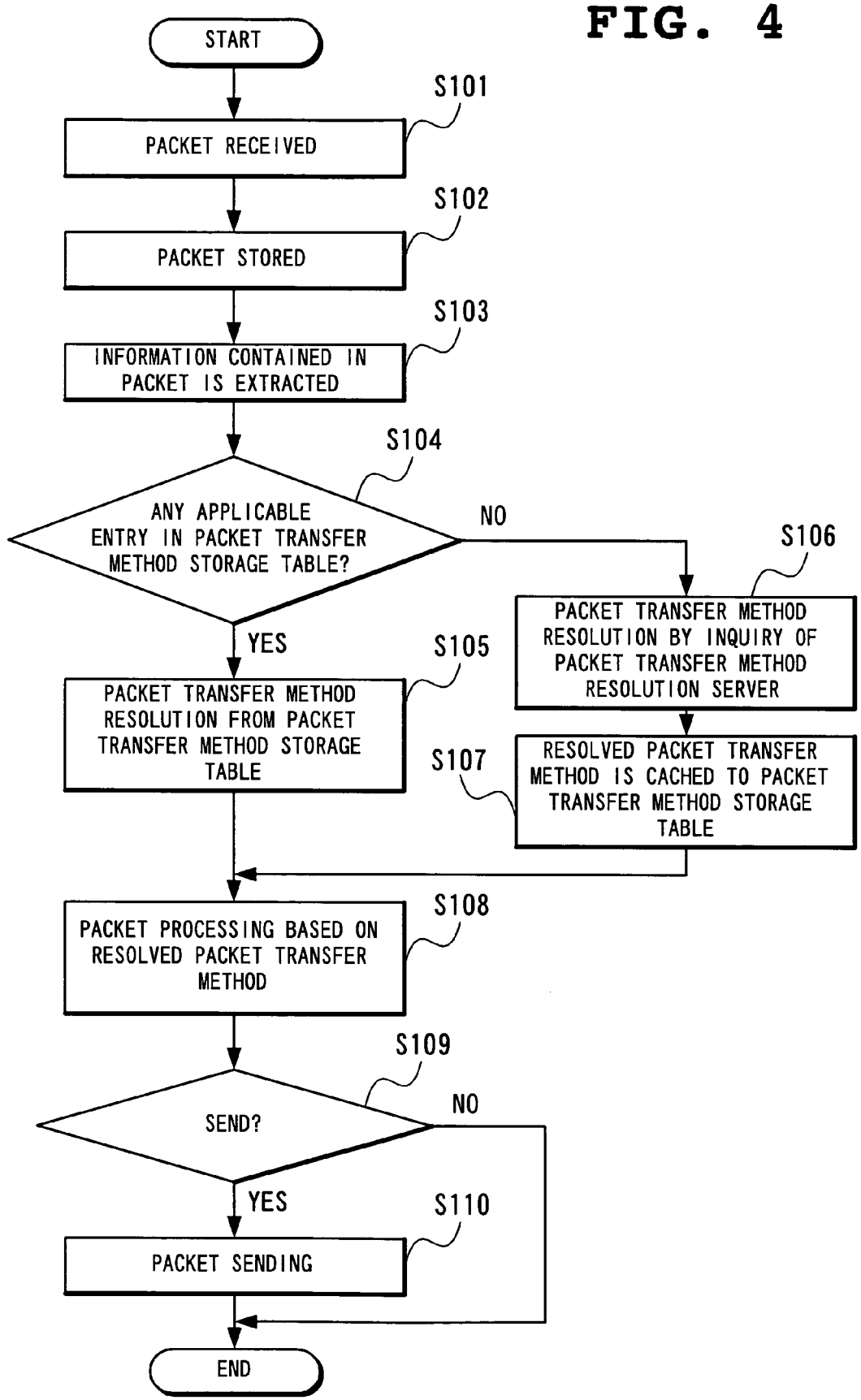
FIG. 4 is a flowchart illustrating the operation of a packet transfer equipment according to the first embodiment of the present invention.

Next, referring to FIG. 4, the operation from receiving to sending of the packet in the packet transfer equipment A1 in this embodiment is described in details.

In the packet transfer equipment A1, when the packet receiver A11 receives a packet from another node (Step S101 in FIG. 4), it stores the received packet to the packet storage A12 (Step S102).

After Step S102, the packet information extraction section A13 is triggered by receiving of the signal indicating packet receiving from the packet receiver A11, analyzes the received packet and extracts the information contained in the applicable packet (step S103).

When the information contained in the received packet is extracted at Step S103, the packet transfer method resolution section A14 resolves the transfer method of that packet. Firstly, the packet transfer method resolution section A14 searches the correspondence table between the information contained in the received packet and the transfer method of that packet in the packet transfer method storage table A15 for the entry applicable to the received packet (Step S104).

If any applicable entry is found as a result of Step S104, the transfer method of the received packet is resolved by the applicable entry (Step S105).

If any applicable entry is not found as a result of Step S104, the packet transfer method resolution request is sent to the packet transfer method resolution server B1 to inquire the transfer method of the received packet for resolution (Step S106). If the packet transfer method resolution server B1 replies that there is no applicable entry, the received packet is judged to be abolished.

In case the transfer method of the received packet is resolved by inquiry of the packet transfer method resolution server B1 at Step S106, the entry is cached to the packet transfer method storage table A15 so that there is no need of inquiry of the packet transfer method resolution server B1 about the packet transfer method when the packet having the same information is received next time (Step S107).

For the steps S106 and S107, the packet transfer equipment A1 retains sending of the receive packet until the packet transfer method is resolved by the packet transfer method resolution server B1. This may increase delay before sending. To cope with this concern, a default packet transfer method may be set at the packet transfer method storage table A15. The transfer method of the received packet is firstly resolved by the default and sending is executed. Meanwhile, the packet transfer method resolution server B1 is inquired background and the transfer method of the applicable packet is resolved and that transfer method is cached to the packet transfer method storage table A15. After thus updating the entry, because the transfer method resolved by the packet transfer method resolution server B1 is cached to the packet transfer method storage table A15, the transfer method can be always resolved quickly. Here, the default transfer method is a transfer method to make a resolution according to certain rules for any received packet. An example of the default transfer method may be the rule like this: the destination IP address of the received packet is checked and the next node to which the applicable packet should be transferred is determined based on the IP routing table.

When the packet transfer method is resolved by Step S105 or Steps 106 to S107, rewriting of the destination IP address and other processes are executed for the received packet stored in the packet storage A12 according to the packet transfer method resolved by the packet processing section A16 (Step S108). The process to abolish the applicable packet is included here.

Further, the packet processing section A16 judges whether to send the packet stored in the packet storage A12 that has been processed at Step S108 to another node or not (Step S109).

When it is judged to be sent at Step S109, the signal to request packet sending is sent to the packet sender A17 and the packet sender A17 sends the applicable packet to another node (Step S110).

When it is judged not to be sent at Step S109 (including the case where the packet is abolished at step S108), the processing is terminated as it is.

Figure 5:
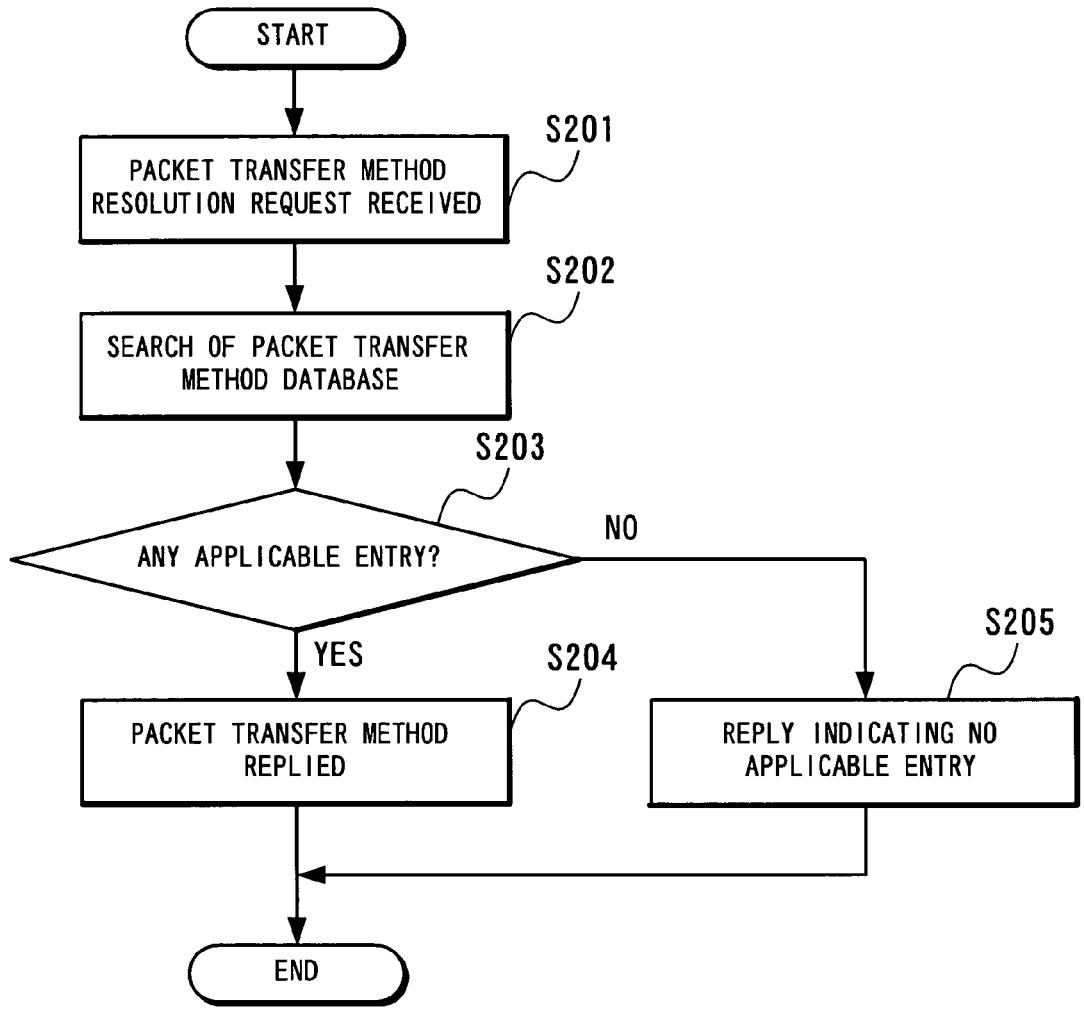
FIG. 5 is a flowchart illustrating the operation of a packet transfer method resolution server according to the first embodiment of the present invention.

Next, referring to FIG. 5, the operation when the packet transfer method resolution server B1 receives the packet transfer method resolution request from the packet transfer equipment A1 in this embodiment is described in details.

When the packet transfer method resolution server B1 receives the packet transfer method resolution request from the packet transfer equipment A1, the packet transfer method resolution request acceptance section B11 accepts the request (Step S201 in FIG. 5).

The packet transfer method resolution request acceptance section B11 recognizes the information contained in the packet for which the transfer method is to be resolved from the received packet transfer method resolution request and searches the packet transfer method database B12 for the entry applicable to that packet (Step S202).

If any entry applicable to the packet is found as a result of Step S202, the transfer method for the packet indicated by that entry is replied to the packet transfer equipment A1 (Steps S203, S204).

If any entry applicable to the packet is not found as a result of Step S202, the message indicating that any applicable entry is not found is replied to the packet transfer equipment A1 (Steps S203 and 205).

This embodiment as described above shows an example where one or more fixed type of information is extracted from the receive packet as the key to resolve the transfer method for the packet so that the information related to one or more type of transfer method determined for each received packet is resolved. This represents the conversion at B, D, J and L in the matrix of FIG. 23. However, the present invention is applicable to the conversion at any one of B to P other than A shown in FIG. 23.

As in conversion at the positions E to H and M to P of FIG. 23, if one or more type of information determined for each received packet is extracted as the key to resolve the transfer method for that packet, the packet information extraction section A13 keeps the extracted packet information correspondence table describing the information about the types to be extracted corresponding to the received packet. The packet information extraction section A13 refers to this table to determine the type of the information to be extracted from each received packet. FIG. 6 shows an example of an extracted packet information correspondence table. When such an extracted packet information correspondence table 109 is used, the packet information extraction section A13 extracts the URL and the Cookie for the received packet having the destination port No. 80 and extracts the destination address and the vlan-ID for the packet having the destination port No. other than 80.

Further, if one or more type of information determined for each received packet is used as the key, the information of the types that can be contained in the key is listed in the input packet information column of the packet transfer method database. For example, when several types of information determined for each received packet are used as the key to resolve the information related to several fixed types of transfer methods regardless of the packet, a packet transfer method database 110 as shown in FIG. 7 is used. In addition, in case several types of information determined for each received packet is used as the key to resolve the information related to several types of transfer methods determined for each packet, a packet transfer method database 111 as shown in FIG. 8 is used.

Next, the effect of this embodiment is described. According to this embodiment, the packet transfer equipment A1 resolves all or any necessary part of the information required for the transfer method of the received packet by making inquiries not only to the packet transfer method storage table A15 in the same node, but also to the packet transfer method resolution server B1 outside. According to the prior art, even if the transfer method of the received packet is inquired of an external server, such inquiry can resolve one type of limited correspondence in a particular field of the packet only. To obtain all pieces or any necessary part of information required for the packet transfer method, the packet transfer equipment needs to have static setting by CLI or NMS inside. Setting by CLI and NMS has a drawback of scalability: the control labor increases linearly for increase of the packet transfer equipments to be controlled. According to this embodiment, the packet transfer equipment A1 automatically resolves the set packet transfer method just with unique setting of the packet transfer methods to be controlled to the packet transfer method resolution server B1. Specifically, the control labor is kept constant even when the number of packet transfer equipments increases and the centralized control of packet transfer methods can be realized with a high scalability.

Second Embodiment of the Present Invention

Next, referring to the attached drawings, a second embodiment of the present invention is described in details below.

This embodiment represents a case in which a DNS server is used as the packet transfer method resolution server B1 in the first embodiment of the present invention. The DNS server is usually used for resolution of the corresponding IP address from the FQDN or, on the contrary, for resolution of the corresponding FQDN from the IP address. In this embodiment, the DNS server functions as a server to map arbitrary information contained in the packet to arbitrary type of transfer method for that packet.

Figure 9:
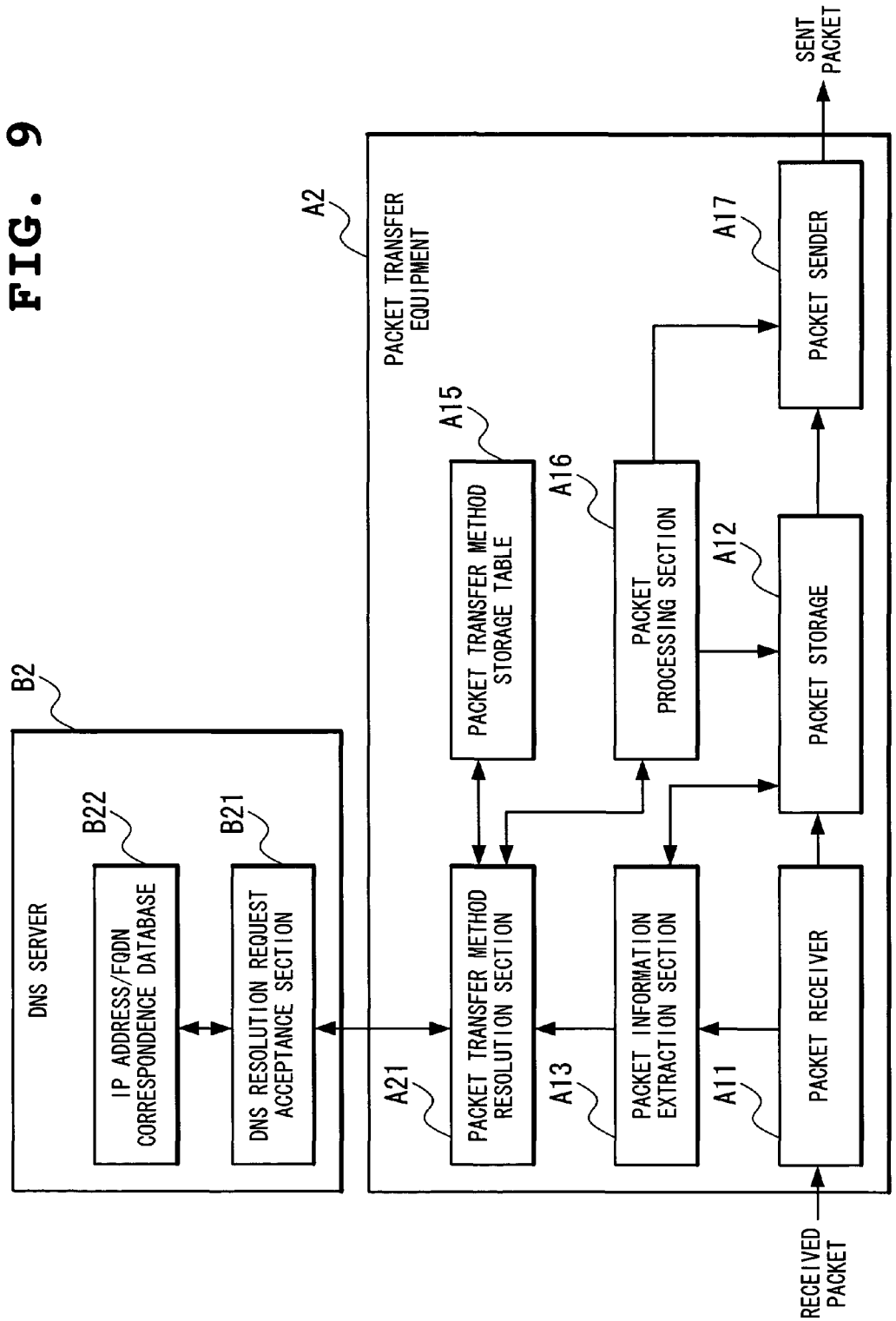
FIG. 9 is a block diagram showing the configuration of a second embodiment according to the present invention.

Referring to FIG. 9, the second embodiment of the present invention is achieved by a packet transfer equipment A2 and a DNS server B2.

The configuration of the packet transfer equipment A2 is different from that of the packet transfer equipment A1 according to the first embodiment of the present invention in that the former has a packet transfer method resolution section A21 instead of the packet transfer method resolution section A14.

The packet transfer method resolution section A21 resolves the transfer method of the packet received by the packet transfer equipment A2 for an external server by sending a DNS resolution request, which is a request to inquire of the DNS server B2 about the IP address corresponding to a certain FQDN or the FQDN corresponding to a certain IP address. Other functions are equivalent to those of the packet transfer method resolution section A14 in the packet transfer equipment A1 according to the first embodiment of the present invention.

The DNS server B2 comprises a DNS resolution request acceptance section B21 and an IP address/FQDN correspondence database B22.

The DNS resolution request acceptance section B21 receives the DNS resolution request from the packet transfer method resolution section A21 and replies to that request with referring to the IP address/FQDN correspondence database B22. It replies the corresponding IP address for a request to resolve the corresponding IP address from the FQDN (IP address resolution request) and replies the corresponding FQDN for a request to resolve the corresponding FQDN from the IP address (FQDN resolution request). It replies the message indicating that any applicable entry is not found if such corresponding IP address or FQDN is not found.

The IP address/FQDN correspondence database B22 is a database to which the DNS resolution request acceptance section refers when it makes a reply to the IP address resolution request and the FQDN resolution request it has received. This database comprises two databases: an IP address resolution database for correspondence from the FQDN to the IP address and an FQDN resolution database for correspondence from the IP address to the FQDN. FIG. 10 shows an example of the IP address/FQDN correspondence database B22. The IP address/FQDN correspondence database comprises an IP address resolution database 103 and an FQDN resolution database 104. An FQDN in the IP address resolution database 103 has the contents to uniquely show several types of information contained in the received packet at the packet transfer equipment that transfers the received packet to another node. Another FQDN in the FQDN resolution database 104 corresponding to the same IP address as the one corresponding to the above FQDN has the contents to uniquely show one or more type of information related to the transfer method of the received packet. Specifically, in case of this embodiment, the FQDN uniquely showing several types of information contained in the received packet and the FQDN uniquely indicating one or more type of information related to the transfer method of the received packet are indirectly associated using the IP address as the intermediate key.

Next, referring to FIGS. 10 and 11, the operation in which the packet transfer method resolution section A21 of the packet transfer equipment A2 makes an inquiry to the DNS server B2 to resolve the transfer method of the packet received by the packet receiver A11 in this embodiment is described in details below. Here, the IP address/FQDN correspondence database B22 of the DNS server B2 is assumed to have the contents as shown in the IP address resolution database 103 and the FQDN resolution database 104, for example.

Figure 11:
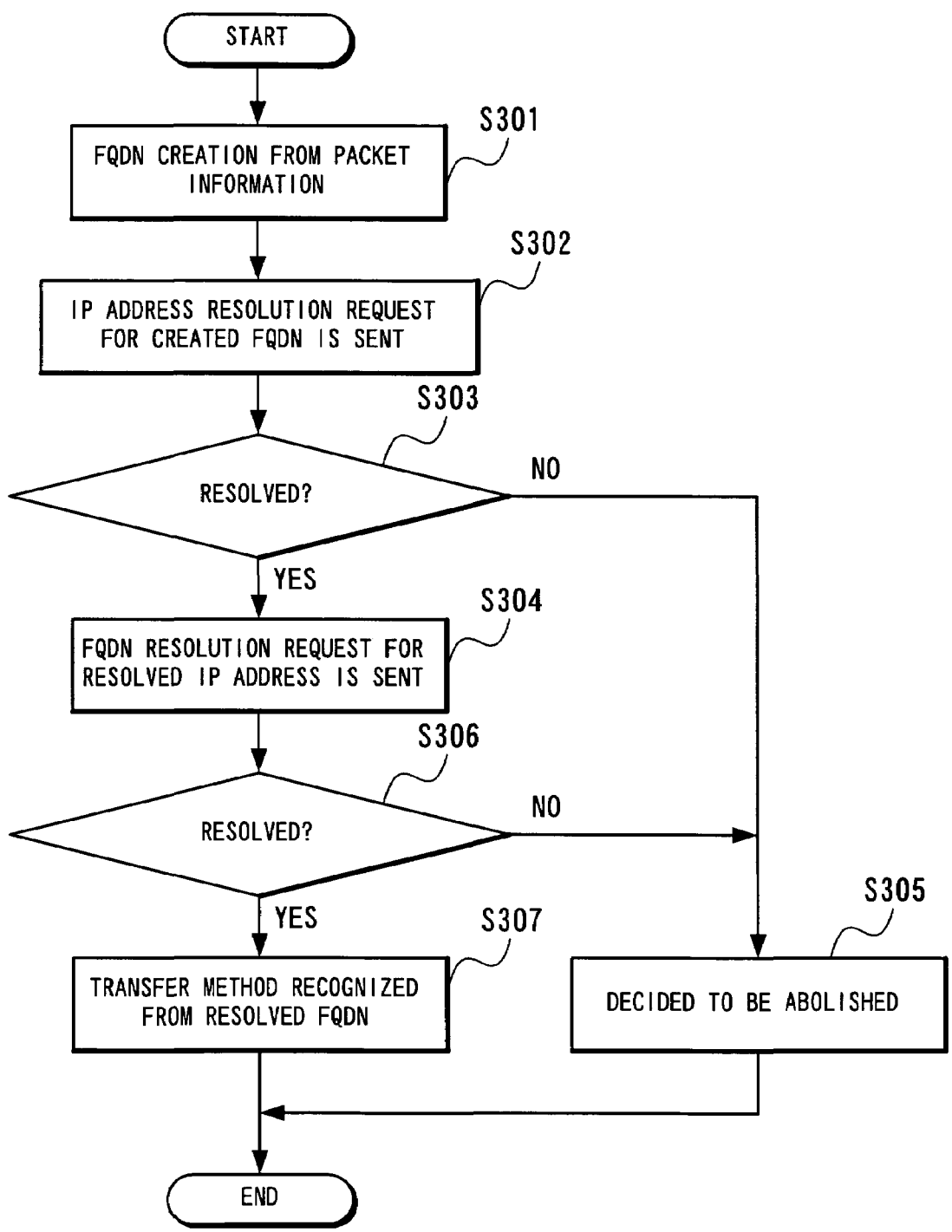
FIG. 11 is a flowchart illustrating the operation of a packet transfer equipment according to the second embodiment of the present invention.

The packet transfer method resolution section A21 creates an FQDN for inquiry as the IP address resolution request to the DNS server B2 based on the information contained in the packet for which the transfer method is to be resolved (Step S301 in FIG. 11). This FQDN creation is executed according to certain rules. For example, in case of a packet having the destination TCP/UDP port number 7070, the destination IP address 20.1.1.1 and the vlan-ID 100, the FQDN is created as dstport-7070.dstip-20-1-1-1.vlan-100.resolve.org.

After Step S301, the IP address for the created FQDN is inquired of the DNS server B2 in the form of the IP address resolution request (Step S302).

The DNS server B2 replies the corresponding IP address or, if any corresponding IP address is not found, replies the message indicating that any applicable entry is not found (Step S303).

If the corresponding IP address can be resolved at Step S303, the FQDN for the resolved IP address is inquired of the DNS server B2 as the FQDN resolution request (Step S304). For example, if the resolved IP address is 192.168.1.1, this IP address is used as it is for the FQDN resolution request to the DNS server B2. This IP address is used as the intermediate key to resolve the FQDN at Step S306.

If the corresponding IP address cannot be resolved at Step S303, the packet received by the packet receiver A11 is decided to be abolished (Step S305).

When the FQDN resolution request is sent at Step S304, the DNS server B2 replies the corresponding FQDN or, if any corresponding FQDN is not found, replies the message indicating that any applicable entry is not found (Step S306).

In case the corresponding FQDN is resolved at Step S306, the resolved FQDN is analyzed so that the packet transfer method is recognized (Step S307). This recognition of the packet transfer method is executed based on the resolved FQDN under certain rules. For example, if the resolved FQDN is dstip-20-2-2-2.dstmac-00-12-34-56-78-0a.vlan-200.resolve.org, it is recognized that the destination IP address is to be rewritten to 20.2.2.2 and the destination MAC address to 0x00:12:34:56:78:0a and the vlan-ID to 200 for that packet. Further, if the resolved FQDN is srcip-30-3-33.dstport-8080.dstmac-00-bc-de-f0-12-34.resolve.org, it is recognized that the source IP address is to be rewritten to 30.3.3.3 and the destination port number to 8080 and the destination MAC address to 0x00:bc:de:f0:12:34 for that packet.

If the corresponding FQDN cannot be resolved at Step S306, the packet received by the packet receiver All is decided to be abolished (Step S305).

Figure 12:
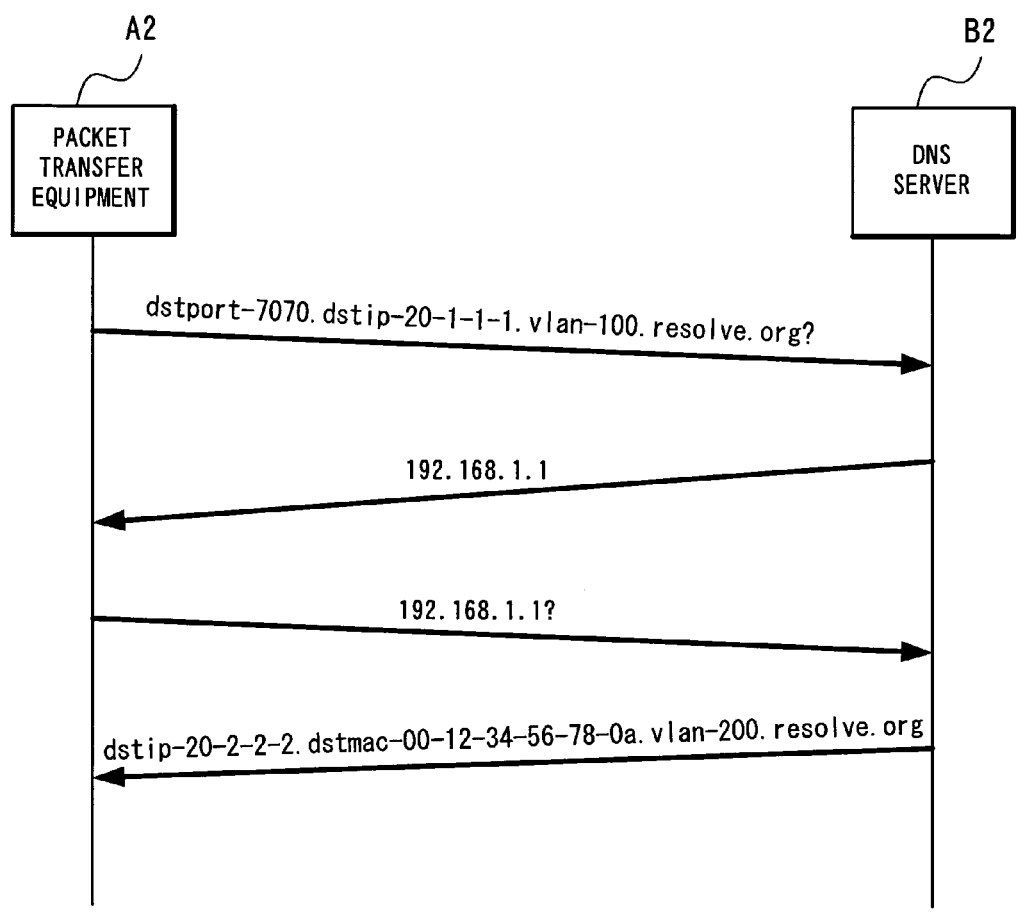
FIG. 12 is a diagram showing an example of messages sent between the packet transfer equipment and a DNS server according to the second embodiment of the present invention.

FIG. 12 shows an example of sequence for the steps S301 to S307 above in which the packet transfer equipment A2 sends the IP address resolution request for dstport-7070.dstip-20-1-1-1.vlan-100.resolve.org to the DNS server B2 and the DNS server B2 finally replies the FQDN dstip-20-2-2-2.dstmac-00-12-34-56-78-0a.vlan200.resolve.org.

In the operation shown by Steps S301 to S307 and FIG. 12, the packet transfer equipment A2 executes the IP address resolution request once and the FQDN resolution request once respectively to resolve the packet transfer method. In addition to this, the packet transfer method may be resolved by sequence of the IP address resolution request and the FQDN resolution request respectively executed for arbitrary number of times corresponding to the operation.

An example is as follows. Firstly, the FQDN resolution request is sent using the destination IP address of the received packet as the key so as to resolve the corresponding FQDN. Then, the resolved FQDN is combined with the information of the destination port number and the vlan-ID contained in the received packet to create a new FQDN and, using such FQDN as the key, the IP address resolution request is sent so as to resolve the corresponding IP address. Further, the FQDN resolution request is sent using the resolved IP address as the key so as to resolve the corresponding FQDN and, based on the resolved FQDN, the transfer method of the received packet is resolved. In the sequence of this example, one IP address resolution request is combined with two FQDN resolution requests.

In addition, though the FQDN uniquely indicating several types of information contained in the received packet and the FQDN uniquely indicating one or more type of information related to the transfer method of the received packet are indirectly associated using the IP address as the intermediate key according to this embodiment, the IP address uniquely indicating several types of information contained in the received packet and the IP address uniquely indicating one or more type of information related to the transfer method of the received packet may be indirectly associated using the FQDN as the intermediate key. Further, the FQDN or the IP address uniquely indicating several types of information contained in the received packet may be directly associated with the IP address or the FQDN uniquely indicating one or more information related to the transfer method of the received packet.

Next, the effect of this embodiment is described. In this embodiment, the DNS server B2 is used instead of the packet transfer method resolution server B1 in the first embodiment of the present invention. Since the DNS server is generally used in the IP network as the server for IP address resolution at present, it is not necessary to prepare a special server for resolution of the packet transfer method by the packet transfer equipment. This facilitates the implementation of the present invention. In addition, the DNS has a hierarchical structure and, even if the DNS server receiving the IP address or FQDN inquiry itself does not have the corresponding entry, a DNS server of an upper layer provides the information about the DNS server having the corresponding entry so that the entry can be automatically resolved by the DNS server having the corresponding entry. For this reason, it is not necessary that the entry describing the packet transfer method for the input packet information is controlled by a single DNS server. It may be controlled by several DNS servers distributed.

Third Embodiment of the Invention

Next, referring to the attached figures, a third embodiment of the present invention is described in details.

This embodiment represents a case in which the packet information extraction section A13 automatically extracts the packet information corresponding to the type of the service to be rendered at the packet transfer equipment A1 in the first embodiment of the present invention.

Figure 13:
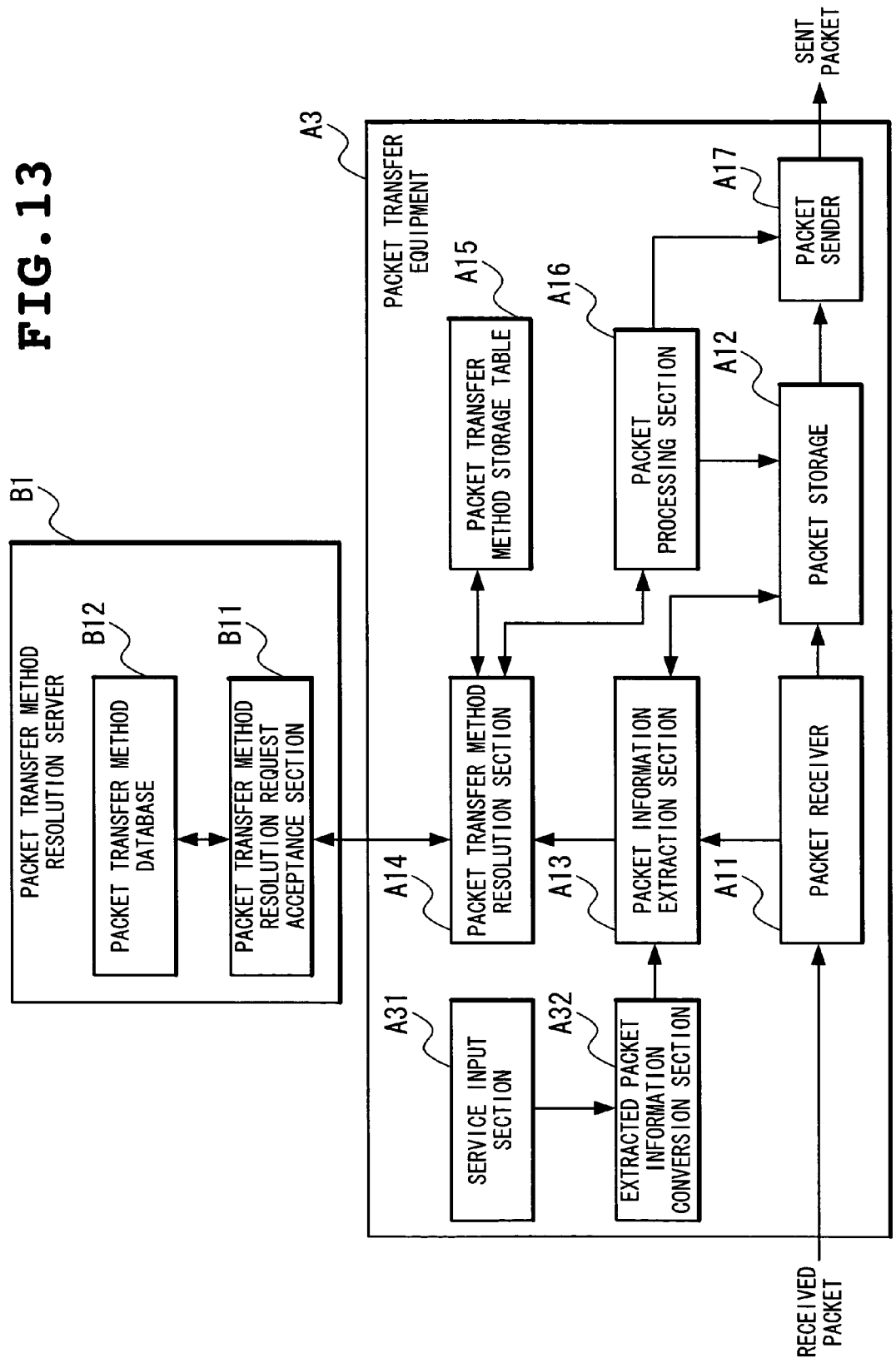
FIG. 13 is a block diagram showing the configuration of a third embodiment according to the present invention.

Referring to FIG. 13, this embodiment can be achieved by a packet transfer equipment A3 and a packet transfer method resolution server B1.

The configuration of the packet transfer equipment A3 is different from that of the packet transfer equipment A1 according to the first embodiment of the present invention in that the former has a service input section A31 and an extracted packet information conversion section A32.

At the service input section A31, the service to be rendered by the packet transfer equipment A3 is set. For example, the equipment may serve as a layer 2 switch, as a router or as a layer 7 switch. In addition to them, services to be rendered may be freely defined and set.

The extracted packet information conversion section A32 converts the service set at the service input section A31 to the packet information required to be extracted for provision of that service based on the extracted packet information conversion table. An extracted packet information conversion table 105 in FIG. 14 shows an example of conversion from the service to the packet information. The converted packet information is set to the packet information extraction section A13 as the packet information to be extracted from the received packet.

This embodiment can be, as shown in the second embodiment of the present invention, achieved by the DNS server B2 used instead of the packet transfer method resolution server B1.

Next, the effect of this embodiment is described. In this embodiment, the packet information extracted by the packet information extraction section A13 is not necessarily set one by one for each type. Just by setting the service to be rendered by the packet transfer equipment A3, conversion from the set service to the extracted packet information is automatically executed. Therefore, this saves the labor of the setting manager of the packet transfer equipment A3.

Fourth Embodiment of the Invention

Next, referring to the attached figures, a fourth embodiment of the present invention is described in details.

This embodiment represents a case in which the packet transfer method resolution server B1 according to the first embodiment of the present invention replies the packet transfer method inquired by the packet transfer equipment A1 considering the resource situation of the network used for transfer of that packet. For example, when the packet transfer equipment A1 receives a packet of the session that requires a band of 10 Mbps, the packet transfer method resolution server replies the packet transfer method so that such packet is transferred via the route having a remaining band space of 10 Mbps.

Figure 15:
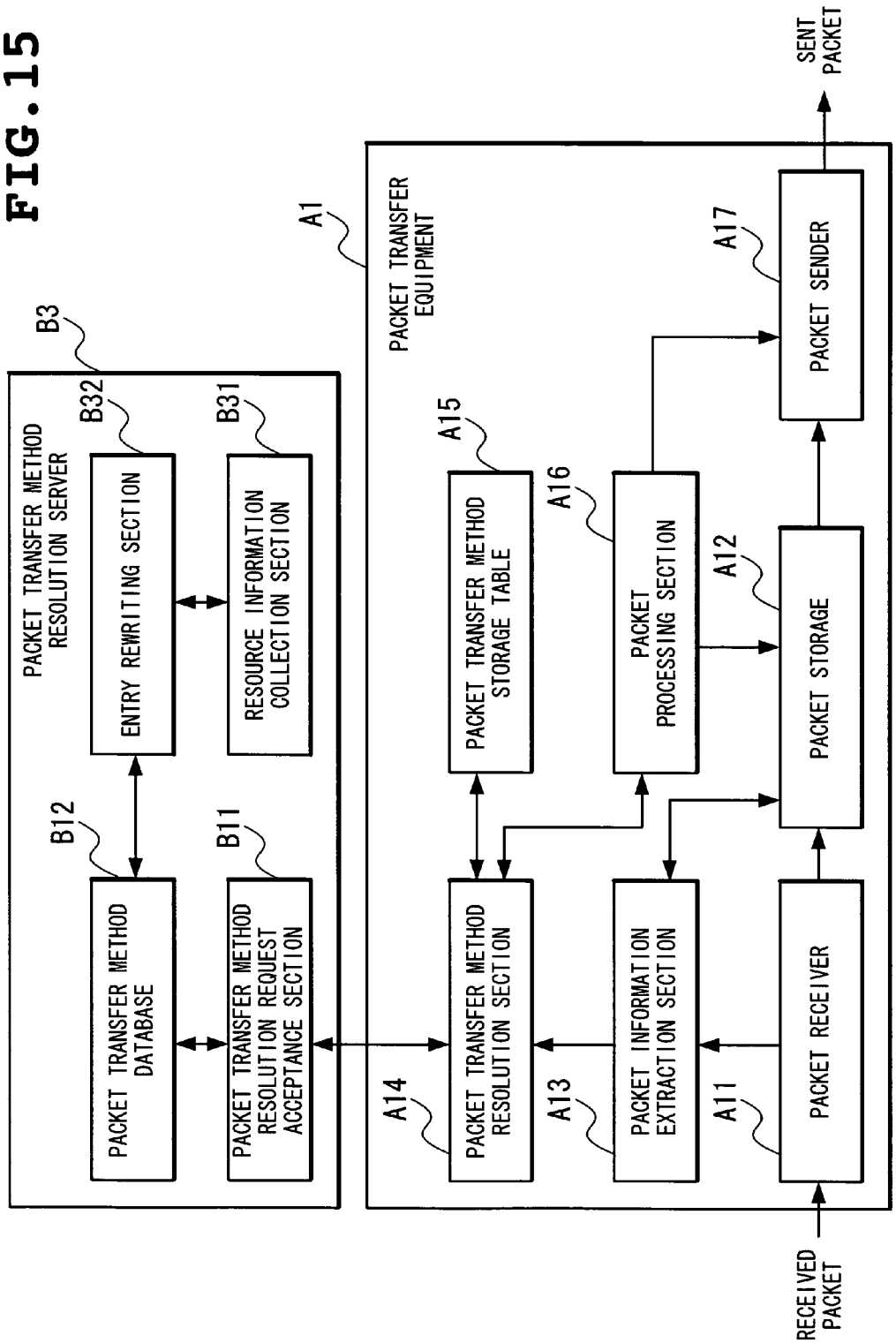
FIG. 15 is a block diagram to show the configuration of a fourth embodiment according to the present invention.

Referring to FIG. 15, this embodiment is achieved by the packet transfer equipment A1 and the packet transfer method resolution server B3. Among them, the packet transfer equipment A1 is the same as the one described in the first embodiment of the present invention.

The packet transfer method resolution server B3 is different from the packet transfer method resolution server B1 described in the first embodiment of the present invention in that it additionally has a resource information collection section B31 and an entry rewriting section B32.

The resource information collection section B31 collects the resource information in the network via which the packet transfer equipment A1 transfers the packet. Examples of resource information include the maximum bandwidth between routers, the remaining bandwidth and the delay or the throughput information between edge nodes of the network and the load on the server. Further, methods for resource information collection include a method using SNMP (Simple Network Management Protocol) and a method to measure the resource value by direct sending of the measurement packet into the network by the packet transfer method resolution server B3.

The entry rewriting section B32 rewrites the entries in the packet transfer method database B12 based on the resource information of the network collected by the resource information collection section B31. Two typical examples of the entry rewriting method based on the resource information are as follows: (i) When the packet transfer method resolution request acceptance section B11 receives the packet transfer method resolution request from the packet transfer equipment A1, the packet transfer method database B12 requests rewriting of the applicable entry to the entry rewriting section B32; (ii) The entry rewriting section B32 periodically checks the resource information and rewrites the entry based on the resource information.

A packet transfer method database 106 in FIG. 16 shows an example of entries prepared as a result of rewriting of the entries in the packet transfer method database B12 by the entry rewriting section B32. The URL contained in the HTTP request message is considered as the input packet information and, if it is "www.movie.org/aaa.fmt", the transfer method (In this case, the destination IP address, the destination MAC address and the user-priority field of the MAC header are rewritten to specified values and transferred) is determined so that the request is guided to the server with a larger downstream (Direction from server to client) band. Further, if the URL is "www.text.net/bbb.txt", the transfer method is determined so that the request is guided to a server with a smaller delay before the server.

In another example, the LSP (Label Switched Path) of the MPLS (Multi-Protocol Label Switching) may be used for packet route control so that the remaining band of each link in the applicable network is always kept to be 20% or more of the maximum physical band. In this case, the packet transfer method resolution server B3 replies, to the packet transfer equipment A1, the MPLS label corresponding to the LSP through which the packet is desired to pass as the packet transfer method. Thus, resource of that network is utilized at the maximum efficiency and the maximum number of users can be accommodated.

As shown in the second embodiment of the present invention, the DNS server B2 may be used as the packet transfer method resolution server. In this case, the resource information collection section B31 and the entry rewriting section B32 are added to the configuration of the DNS server B2.

Next, the effect of this embodiment is described. In this embodiment, when the packet transfer method resolution server B3 makes a reply to the packet transfer method resolution request from the packet transfer equipment A1, it replies the packet transfer method considering the resource information of the network. With consideration of the resource information, the packet transfer can be controlled closely corresponding to the characteristics of the packet.

Fifth Embodiment of the Invention

Next, referring to the attached figures, a fifth embodiment of the present invention is described in details.

This embodiment represents a case in which, when returning a reply to the packet transfer method resolution request from the packet transfer equipment A1, the packet transfer method resolution server B1 according to the first embodiment of the present invention makes a request to control the resource on the nodes in the network together at the same time (Reservation, priority control and so on) and controls the transfer quality of the packet sent by the packet transfer equipment A1.

Figure 17:
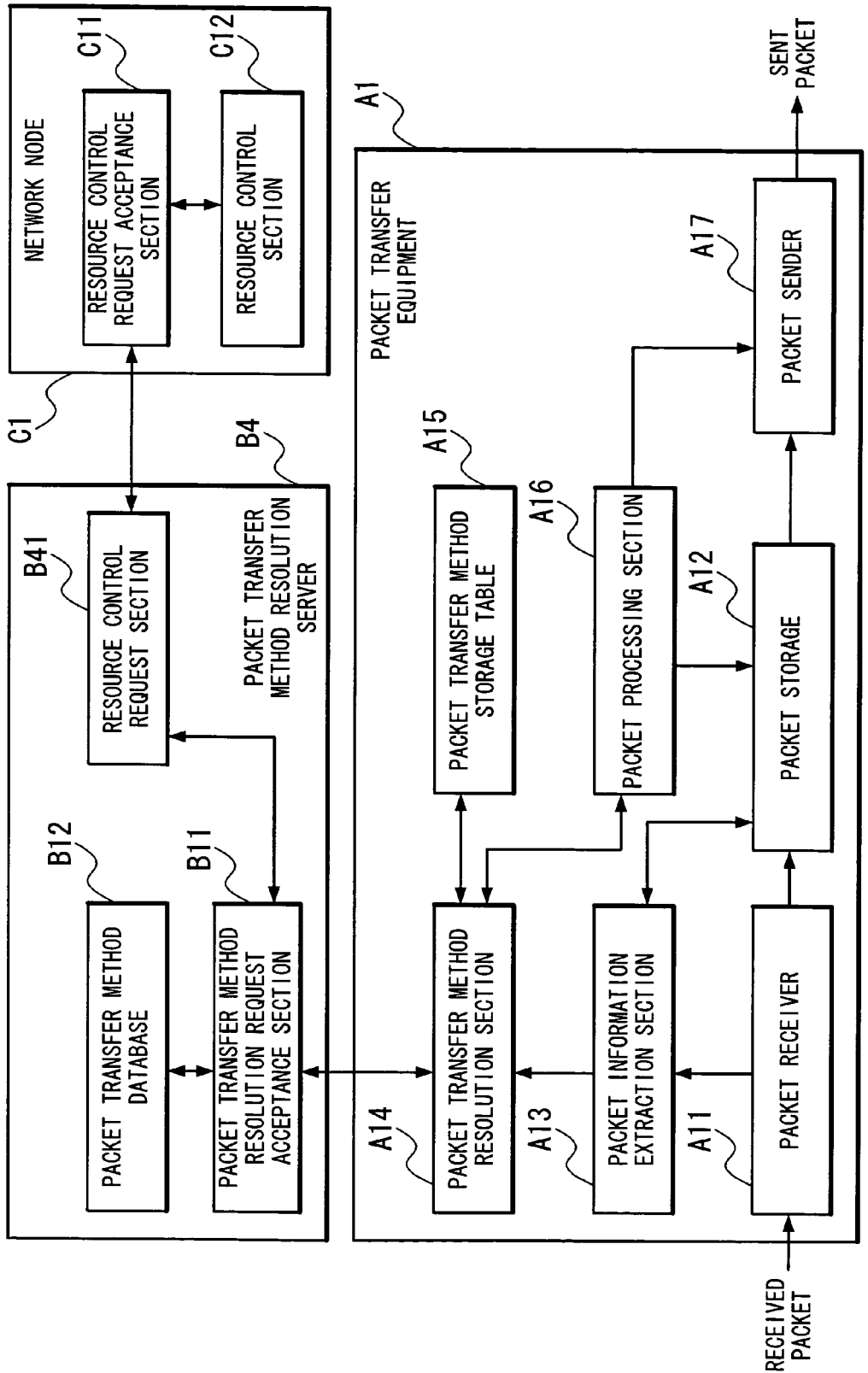
FIG. 17 is a block diagram showing the configuration of a fifth embodiment according to the present invention.

Referring to FIG. 17, this embodiment is achieved by the packet transfer equipment A1, a packet transfer method resolution server B4 and a network node C1. Among them, the packet transfer equipment A1 is the same as the one described in the first embodiment of the present invention. The network node C1 is a node existing in the network via which the packet transfer equipment transfers the received packet. It executes the transfer processing for the packets passing the network. Examples of the network node C1 include a router, a layer 2 switch and an ATM switch. There are usually several network nodes C1 in the network, but the behavior of one such node is described here for simplification.

The packet transfer method resolution server B4 is different from the packet transfer method resolution server B1 described in the first embodiment of the present invention in that it additionally has a resource control request section B41.

The packet transfer method database B12 can contain the information related to the resource control as the transfer method for the input packet. A packet transfer method database 107 in FIG. 18 shows an example of entries registered to the packet transfer method database B12. The first entry in the packet transfer method database 107 shows that the band assurance of 10 Mbps is required at three passage nodes A, B and C as the resource control for the input packet. The second entry shows that, as the resource control for the input packet, the control for transfer with priority in the band up to 5 Mbps is required for three passage nodes A, C and D. The third entry shows that any resource control is not required for the input packet.

If any resource control on the network node C1 in the network is required as the packet transfer method replied to the packet transfer equipment A1 by the packet transfer method resolution request acceptance section B11, the resource control request section B41 makes a request to control the resource on the network node C1 by sending the resource control request to the network node C1. In case of the packet transfer method database 107, the resource control request to assure a band of 10 Mbps for the applicable packet is sent to the network nodes A, B and C for the first entry. For the second entry, the resource control request for transfer with priority up to 5 Mbps for the applicable packet is sent to the network nodes A, C and D.

The network node C1 contains a resource control request acceptance section C11 and a resource control section C12.

The resource control request acceptance section C11 receives the resource control request from the packet transfer method resolution server B4 and sets the resource control section C12 so that the requested resource control can be executed. Then, it replies whether the requested resource control is successfully set or not to the packet transfer method resolution server B4.

The resource control section C12 actually controls the resource in relation to the network node C1 (link band or the like).

Figure 19:
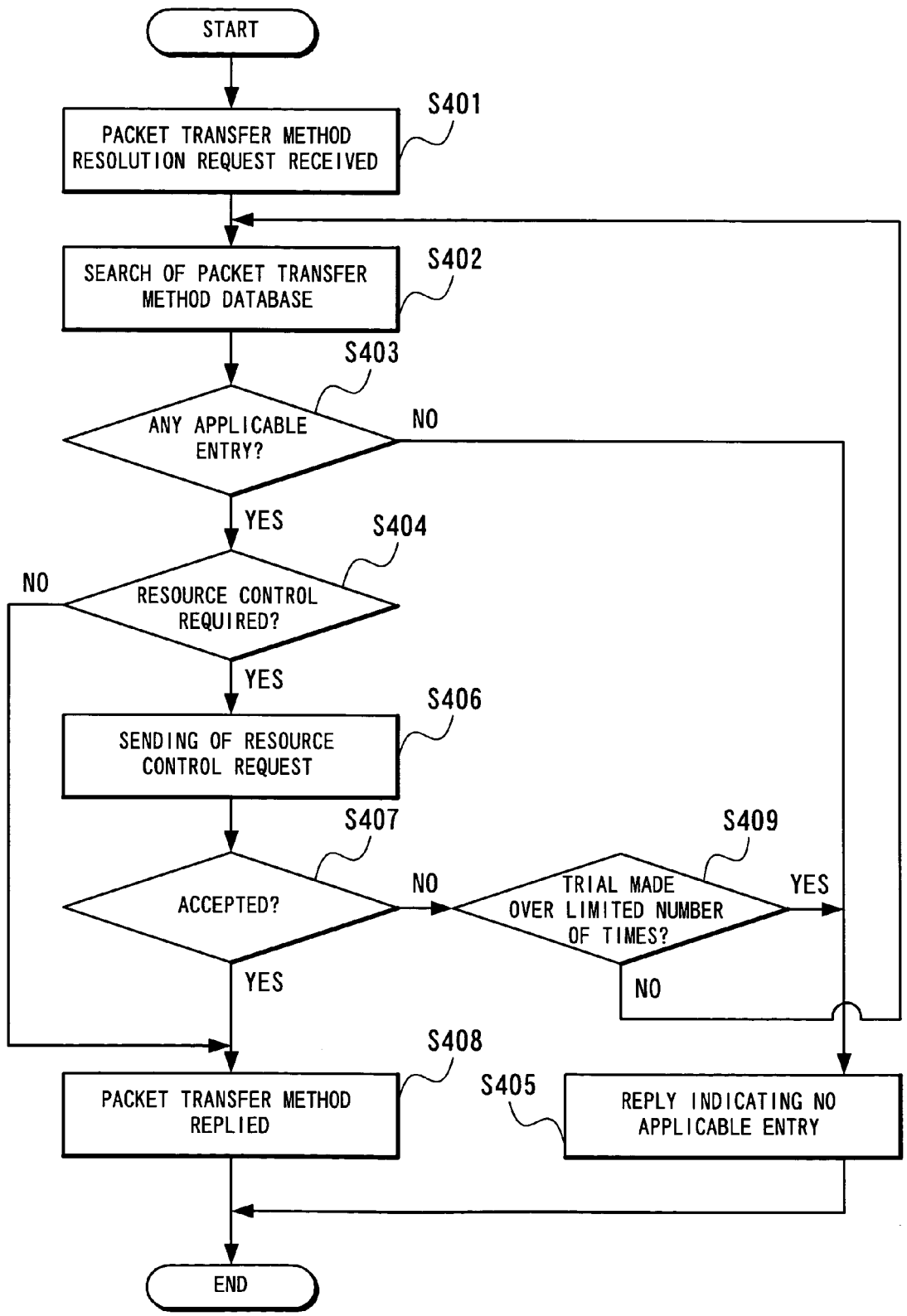
FIG. 19 is a flowchart illustrating the operation of the packet transfer method resolution server according to the fifth embodiment of the present invention.

Next, referring to FIG. 19, the operation in which the packet transfer method resolution server B4 receives the packet transfer method resolution request from the packet transfer equipment A1 and returns a reply to the packet transfer equipment A1 in this embodiment is described in details.

When the packet transfer method resolution request from the packet transfer equipment A1 is received by the packet transfer method resolution server B4, the packet transfer method resolution request acceptance section B11 accepts that request (Step S401 in FIG. 19).

The packet transfer method resolution request acceptance section B11 recognizes, from the received packet transfer method resolution request, the information contained in the packet for which the transfer method is to be resolved. It searches the packet transfer method database B12 for the entry applicable to that packet (Steps S402 and S403).

If any entry applicable to that packet is not found as a result of Step S403, the message indicating that no applicable entry is found is replied to the packet transfer equipment A1 (Step S405).

If any entry applicable to that packet is found as a result of Step S403, the packet transfer method resolution request acceptance section B11 judges whether the packet transfer method described in such entry requires the resource control or not (Step S404).

If the resource control is found necessary as a result of Step S404, the required resource control is identified and the resource control request is sent to the network node C1 via the resource control request section B41 (Step S406).

If the resource control is found unnecessary as a result of Step S404, the packet transfer method read at Step S403 is replied to the packet transfer equipment A1.

When the resource control request sent at Step S406 is accepted, the packet transfer method read at Step S403 is replied to the packet transfer equipment A1 (Steps S407 and S408).

When the resource control request sent at Step S406 is not accepted, the processing goes back to Step S402 and makes retrial (Steps S407 and S409). However, if the trial has been already executed for the limited number set in advance, the trial is not made and the message indicating that the applicable entry is not found is replied to the packet transfer equipment A1 (Steps S409 and S405).

Though the packet transfer method resolution server B4 sends the resource control request to the network node C1 in this embodiment, the resource control request may be also sent to the network node C1 by the packet transfer equipment A1 based on the information contained in the transfer method resolved with the packet transfer method resolution server B4. In this case, the packet transfer equipment A1 has the function corresponding to the resource control request section B41.

In addition, as shown in the second embodiment of the present invention, this embodiment may be realized using the DNS server B2 as the packet transfer method resolution server. In this case, the resource control request section B41 is added to the configuration of the DNS server B2. For example, the DNS resolution request acceptance section B11 recognizes whether the resource control is required or not as follows: If the FQDN indicating the packet transfer method replied to the packet transfer equipment A1 is "rsvbw-10

Mbps.node-A-B-C.dstip -20-2-2-2.dstmac-00-12-34-56-78-0a.vlan-200.resolve.org", the section "rsvbw-10 Mbps.node-A-B-C" is read and it is recognized that the band reservation for 10 Mbps is required at nodes A, B and C.

Next, the effect of this embodiment is described. In this embodiment, when the packet transfer method resolution server B4 sends a reply to the packet transfer method resolution request from the packet transfer equipment A1, it makes a request for the resource control on the node in the network at the same time so as to control the transfer quality of the packet sent by the packet transfer equipment A1. By controlling the network resource at the same time, close packet transfer control corresponding to the characteristics of the packet can be achieved as in the fourth embodiment of the present invention.

Sixth Embodiment of the Invention

Next, referring to the attached figures, a sixth embodiment of the present invention is described in details.

This embodiment represents a case in which the packet transfer method resolution server B1 according to the first embodiment of the present invention controls the packet transfer method to be replied based on the packet transfer policy input from outside when replying the packet transfer method inquired by the packet transfer equipment A1 so that the business to obtain consideration for such control from the network users is realized. The network users here represent the end users at home and office and the service providers who provide services such as various contents and applications to the end users.

Figure 20:
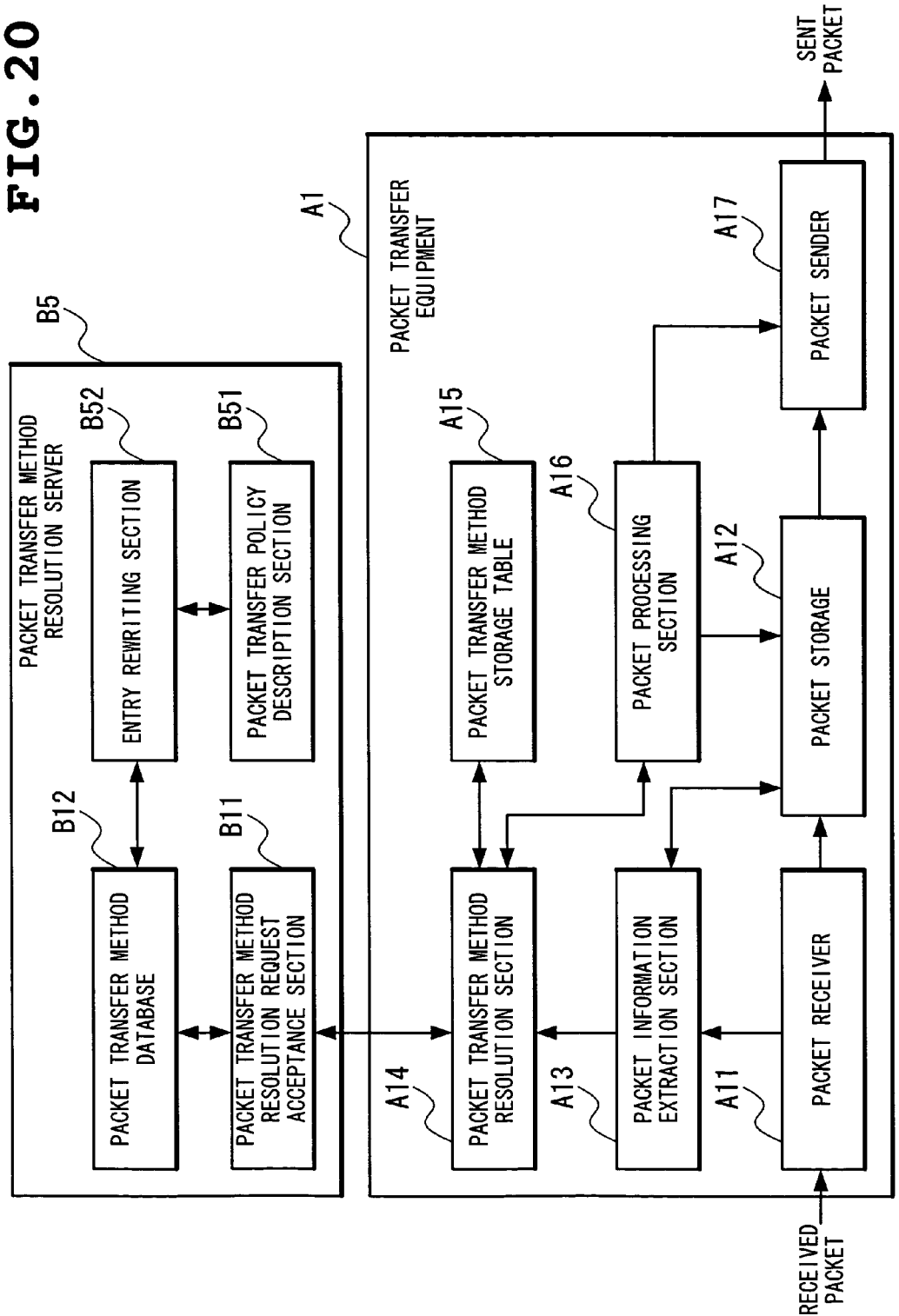
FIG. 20 is a block diagram showing the configuration of a sixth embodiment according to the present invention.

Referring to FIG. 20, this embodiment is realized by the packet transfer equipment A1 and a packet transfer method resolution server B5. Among them, the packet transfer equipment A1 is the same as the one described in the first embodiment of the present invention.

The packet transfer method resolution server B5 is different from the packet transfer method resolution server B1 described in the first embodiment of the present invention in that it has a packet transfer policy description section B51 and an entry rewriting section B52 in addition to the configuration of the packet transfer method resolution server B1.

The packet transfer policy description section B51 describes the policy to control the packet transfer method replied to the packet transfer method resolution request from the packet transfer equipment A1. An example of the packet transfer policy is shown in a packet transfer policy description table 108 of FIG. 21. In this example, the first entry describes the policy to provide the priority for 1000 times at most to the processing as follows: to rewrite the request packet having the URL "www.portal.com" and the destination port number "80" so that it has the URL "www.biglobe.net" and the destination IP address "20.1.1.1" and to transfer such packet. The second entry describes the policy according to which 60% of the request packet having the URL "www.abc.org" and the destination port number "8080" is rewritten so that it has the URL "www.xyz.com", the destination IP address "30.1.1.1" and the vlan-ED "100" and is transferred.

The entry rewriting section B52 rewrites the entries in the packet transfer method database B12 based on the packet transfer policy described in the packet transfer policy description section B51. FIG. 22 shows an example of the packet transfer method database rewritten by the entry rewriting section B52 when the packet transfer policy description table 108 of FIG. 21 is used as the packet transfer policy. Referring to a packet transfer method database 112 of FIG. 22, the first entry describes two transfer methods: a method to rewrite the request packet having the URL "www.portal.com" and the destination port number "80" to have the URL "www.biglobe.net", the destination address "20.1.1.1" and the vlan-ID "100" and transfer such packet; and a method to rewrite only the vlan-ID to "100" and transfer such packet. Selection standard column shows the selection standard that the former method is selected with priority for 1,000 more times (this number of times is to be reduced corresponding to the times of selection) and the latter is selected in default setting (selected when there is no other transfer method to be selected with priority). In addition, the second entry describes two transfer methods: a method to rewrite the request packet having the URL "www.abc.org" and the destination port number "8080" so that it has the URL "www.xyz.com" and the destination IP address "30.1.1.1" and to transfer such packet; and a method to rewrite the vlan-ID to "100" and to transfer such packet. The selection standard column shows the selection standard to select the former method with a weight of 60% and the latter method with a weight of 40%.

Next, examples of business models according to this embodiment are described below.

According to a first business model, the contents service provider or the application service provider has the packet transfer method resolution server B5 execute the control to guide the contents acquisition request or application execution request from the user to its own server and pays the consideration to the network service provider managing the packet transfer method resolution server B5. Conventionally, there have been services in which the search server displays the link to the URL of the provider of that service at a high rank in the list displayed as the search result so as to guide the request from the user positively. However, there has been no service to guide the request from the user through control by the network.

According to a second business model, the packet transfer method resolution server B5 controls the transfer method of the request from the user corresponding to the user's context information (such as the user location, device used by the user, current time and user's taste). For example, in response to a request for map display, the transfer is controlled so that the request is guided to the server that displays the map of the user's location based on the user's location information (Source IP address, vlan-ID and so on). Alternatively, in response to a request for access to a web site of nearby restaurants, the transfer is controlled so that the request is guided to the web site of the restaurants that are currently open. In this business model, the users or the contents service providers or the application service providers pay the consideration to the network service provider managing the packet transfer method resolution server B5.

This embodiment may be, as shown in the second embodiment of the present invention, realized using the DNS server B2 as the packet transfer method resolution server. In this case, the packet transfer policy description section B51 and the entry rewriting section B52 are added to the configuration of the DNS server B2.

Next, the effect of this embodiment is described. This embodiment is to run the business in which the packet transfer method replied to the packet transfer equipment A1 is controlled according to the packet transfer policy input from outside and consideration for such control is paid by the network users. With this embodiment, a new business as described in the business model example above can be realized.

Though the present invention has been described with listing several embodiments so far, the present invention is not limited to the above embodiments and can be enhanced or modified in various ways. In addition, the functions of the packet transfer equipment, the packet transfer method resolution server and the DNS server of the present invention can be realized of course by the hardware and also can be realized by the computer and programs. The packet transfer equipment program, the packet transfer method resolution server program and the DNS server program are recorded and provided in the computer-readable recording media such as magnetic disks or semiconductor memories so that they are read by the computer when the computer is booted up, for example, and they control the operation of the computer to have that computer function as the packet transfer equipment, the packet transfer method resolution server and the DNS server in the above embodiments.

A first effect is that the management of the packet transfer equipment can be centralized. Because the present invention enables the packet transfer equipment to automatically resolve the correspondence represented at B to P in FIG. 23 by inquiring of the packet transfer method resolution server outside about the transfer method of the received packet, it is not necessary to set the packet transfer method in each packet transfer equipment.

A second effect is that the management of the packet transfer equipment can be centralized using an existing DNS server. This is because the present invention enables the existing DNS server to serve as the packet transfer method resolution server.

A third effect is that a new business style can be realized. This is because the present invention enables setting of the policy for the packet transfer control profitable for a particular network user to the packet transfer method resolution server and can thereby have the packet transfer equipment execute the packet transfer based on such packet transfer policy. Thus, a business model to obtain consideration from network users can be realized.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A packet transfer method resolution server comprising: a packet transfer method database where correspondences between several types of information contained in a packet and one or more type of information related to a packet transfer method are registered, wherein the several types of information contained in a packet include URL data, destination IP address data, and VLAN-ID data, and wherein the one or more type of information related to a packet transfer method that are registered include source IP address data, destination MAC address data, and VLAN-ID data, wherein the several types of information contained in a packet and the one or more type of information related to a packet transfer method are registered in the packet transfer method database as a one-to-one correspondence with respect to a URL data entry, a destination IP address data entry, a VLAN ID data entry, a source IP address data entry, a destination MAC address data entry, and a VLAN-ID data entry, and a packet transfer method resolution request acceptance section that accepts a packet transfer method resolution request from a packet transfer equipment that transfers a received packet to another node inquiring the information related to a transfer method of said received packet and specifying information contained in said received packet, refers to said packet transfer method database, and provides the one or more type of information related to the transfer method of said received packet to said packet transfer equipment, based on the combination of the URL data, the destination IP address data, and the VLAN-ID data of the received packet, wherein said received packet is transferred to the another node in a downstream direction towards a destination node, in accordance with the transfer method, wherein:

the one or more type of information provided to said packet transfer equipment as the information related to the packet transfer method contains each of:

the information related to rewriting of the information contained in the received packet, the information related to the information added to the received packet, the information related to the information deleted from the received packet, the information related to the control method of the route through which the received packet is transferred and the information related to the resource control method for the route through which the received packet is transferred.

2. The packet transfer method resolution server as set forth in claim 1 further comprising:

a resource information collection section that collects resource information in a network; and an entry rewriting section that rewrites entries registered to said packet transfer method database based on the resource information in said network collected by said resource information collection section.

3. The packet transfer method resolution server as set forth in claim 1, wherein, when the request for the resource control is not accepted by said other nodes, retrials of the request for resource control are made up to a predetermined number of times at future times until one of the retrials is accepted, and wherein if none of the retrials is accepted, a message is output indicated that no applicable entry has been found in the packet transfer method database.

4. The packet transfer method resolution server as set forth in claim 1, further comprising a second packet transfer method database which stores all of the information stored in the packet transfer method database, along with a destination port number related to a packet transfer method, wherein when a packet transfer method for the received packet cannot be resolved based on the information stored in the packet transfer method database, the second packet transfer method database is utilized to determine a particular packet transfer method to transfer the received packet.

5. A packet transfer method resolution server comprising: a packet transfer method database where correspondences between several types of information contained in a packet and one or more type of information related to a packet transfer method are registered, wherein the several types of information contained in a packet include URL data, destination IP address data, and VLAN-ID data, and wherein the one or more type of information related to a packet transfer method that are registered include source IP address data, destination MAC address data, and VLAN-ID data, wherein the several types of information contained in a packet and the one or more type of information related to a packet transfer method are registered in the packet transfer method database as a one-to-one correspondence with respect to a URL data entry, a destination IP address data entry, a VLAN ID data entry, a source IP address data entry, a destination MAC address data entry, and a VLAN-ID data entry;

a packet transfer method resolution request acceptance section that accepts a packet transfer method resolution request from a packet transfer equipment that transfers a received packet to another node inquiring the information related to a transfer method of said received packet and specifying information contained in said received packet, refers to said packet transfer method database, and provides the one or more type of information related to the transfer method of said received packet to said packet transfer equipment, based on the combination of the URL data, the destination IP address data, and the VLAN-ID data of the received packet; and a resource control request section that, if resource control for other nodes in the network is necessary, sends a request for resource control of said other nodes as additional information of said transfer method when said packet transfer method resolution request acceptance section provides the information related to said transfer method in response to said packet transfer method resolution request from said packet transfer equipment, wherein said received packet is transferred to the another node in a downstream direction towards a destination node, in accordance with the transfer method.

6. The packet transfer method resolution server as set forth in claim 5 further comprising:

a packet transfer policy description section that describes a policy to control the information related to said transfer method replied by said packet transfer method resolution request acceptance section in response to said packet transfer method resolution request from said packet transfer equipment, and an entry rewriting section that rewrites entries registered to said packet transfer method database based on said policy described in said packet transfer policy description section.

7. The packet transfer method resolution server as set forth in claim 5, wherein, when the request for the resource control is not accepted by said other nodes, retrials of the request for resource control are made up to a predetermined number of times at future times until one of the retrials is accepted, and wherein if none of the retrials is accepted, a message is output indicated that no applicable entry has been found in the packet transfer method database.

8. The packet transfer method resolution server as set forth in claim 5, further comprising a second packet transfer method database which stores all of the information stored in the packet transfer method database, along with a destination port number related to a packet transfer method, wherein when a packet transfer method for the received packet cannot be resolved based on the information stored in the packet transfer method database, the second packet transfer method database is utilized to determine a particular packet transfer method to transfer the received packet.

* * * * *